(12) United States Patent
Schoppmeier

(10) Patent No.: US 10,536,464 B2
(45) Date of Patent: Jan. 14, 2020

(54) SECURE AND SMART LOGIN ENGINE

(71) Applicant: INTEL CORPORATION, Santa Clara, CA (US)

(72) Inventor: Dietmar Schoppmeier, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 124 days.

(21) Appl. No.: 15/189,471

(22) Filed: Jun. 22, 2016

(65) Prior Publication Data
US 2017/0374073 A1  Dec. 28, 2017

(51) Int. Cl.
*H04L 29/06* (2006.01)
*H04L 9/08* (2006.01)

(52) U.S. Cl.
CPC .............. *H04L 63/102* (2013.01); *H04L 9/08* (2013.01); *H04L 63/0861* (2013.01)

(58) Field of Classification Search
CPC ..... H04L 63/102; H04L 63/0861; H04L 9/08; G06F 21/45
USPC .......................................................... 726/7
See application file for complete search history.

(56) References Cited

U.S. PATENT DOCUMENTS

| | | | | |
|---|---|---|---|---|
| 4,984,177 A * | 1/1991 | Rondel | ...................... | G06F 3/16 704/277 |
| 6,671,669 B1 * | 12/2003 | Garudadri | ............... | G10L 15/32 704/255 |
| 7,500,106 B2 * | 3/2009 | Herberth | ................. | G06F 21/62 713/165 |
| 8,296,574 B2 * | 10/2012 | Kosaka | .................... | G06F 21/32 713/186 |
| 8,392,965 B2 * | 3/2013 | Carter | ..................... | G06F 21/34 382/115 |
| 8,756,672 B1 * | 6/2014 | Allen | ...................... | G06F 21/36 345/173 |
| 8,868,923 B1 * | 10/2014 | Hamlet | ................... | G06F 21/00 326/8 |
| 8,887,255 B2 * | 11/2014 | Hirose | .................. | H04W 12/06 726/7 |
| 9,323,912 B2 * | 4/2016 | Schultz | .................... | G06F 21/32 |
| 9,349,035 B1 * | 5/2016 | Gerber | .............. | G06K 9/00013 |
| 9,355,234 B1 * | 5/2016 | Magi Shaashua | ...... | G06F 21/32 |
| 9,706,406 B1 * | 7/2017 | Adams | .................. | H04W 12/08 |
| 9,870,770 B2 * | 1/2018 | Bang | ....................... | G10L 15/20 |
| 2002/0024419 A1 * | 2/2002 | Dunn | ..................... | G06F 21/32 340/5.52 |
| 2002/0034280 A1 * | 3/2002 | Infosino | ............ | H04M 3/42229 379/88.02 |

(Continued)

*Primary Examiner* — Shahriar Zarrineh
(74) *Attorney, Agent, or Firm* — Eschweiler & Potashnik, LLC

(57) ABSTRACT

A login engine for a network device can operate to secure or determine login access in response to a login request according to different sensor data of one or more physical properties. In response to the login request, a first sensor related to a first physical property can operate to detect individual characteristic data and content data. The individual characteristic data can be compared other individual characteristic data of a user profile, which can be stored in a data store. The content data can also be compared to other content data of the user profile. Based on these comparisons satisfying predetermined thresholds, a successful login stage of a plurality of login stages can be enabled.

10 Claims, 10 Drawing Sheets

(56) References Cited

U.S. PATENT DOCUMENTS

| | | | | |
|---|---|---|---|---|
| 2003/0123710 | A1* | 7/2003 | Nakazawa | G07C 9/00087 382/115 |
| 2003/0216964 | A1* | 11/2003 | MacLean | G06Q 30/02 705/14.28 |
| 2004/0104266 | A1* | 6/2004 | Bolle | G06F 21/6245 235/382 |
| 2006/0182318 | A1* | 8/2006 | Shigeta | G06K 9/00026 382/124 |
| 2008/0097851 | A1* | 4/2008 | Bemmel | G06Q 30/02 705/14.36 |
| 2008/0115208 | A1* | 5/2008 | Lee | G06F 21/31 726/19 |
| 2008/0162338 | A1* | 7/2008 | Samuels | G06F 21/40 705/38 |
| 2008/0172729 | A1* | 7/2008 | Takamizawa | H04L 63/0861 726/7 |
| 2009/0203355 | A1* | 8/2009 | Clark | G06F 21/32 455/411 |
| 2010/0115597 | A1* | 5/2010 | Murakawa | H04L 9/3231 726/7 |
| 2010/0205667 | A1* | 8/2010 | Anderson | G06F 3/013 726/19 |
| 2010/0322484 | A1* | 12/2010 | Hama | G06F 21/32 382/115 |
| 2011/0185413 | A1* | 7/2011 | Fujii | G06F 21/32 726/7 |
| 2012/0019379 | A1* | 1/2012 | Ben Ayed | G08B 13/1436 340/539.1 |
| 2012/0274793 | A1* | 11/2012 | Choi | H04N 5/222 348/207.11 |
| 2013/0051628 | A1* | 2/2013 | Fukuda | G06K 9/00885 382/115 |
| 2013/0061309 | A1* | 3/2013 | Diaz-Cuellar | H04L 63/102 726/9 |
| 2013/0104187 | A1* | 4/2013 | Weidner | G06F 21/45 726/1 |
| 2013/0169801 | A1* | 7/2013 | Martin | H04N 5/23206 348/143 |
| 2013/0225128 | A1* | 8/2013 | Gomar | H04W 12/06 455/411 |
| 2013/0227678 | A1* | 8/2013 | Kang | G06F 21/32 726/19 |
| 2013/0243264 | A1* | 9/2013 | Aoki | G06K 9/00013 382/115 |
| 2013/0259321 | A1* | 10/2013 | Aoki | G06K 9/00885 382/115 |
| 2013/0262873 | A1* | 10/2013 | Read | H04W 12/06 713/186 |
| 2013/0291073 | A1* | 10/2013 | Dec | G06F 21/41 726/5 |
| 2013/0298208 | A1* | 11/2013 | Ayed | G06F 21/00 726/6 |
| 2013/0305056 | A1* | 11/2013 | Johnson | G06F 21/32 713/186 |
| 2013/0326605 | A1* | 12/2013 | Betz | H04W 12/06 726/7 |
| 2013/0326607 | A1* | 12/2013 | Feng | H04L 63/10 726/7 |
| 2014/0007210 | A1* | 1/2014 | Murakami | G06K 9/00899 726/7 |
| 2014/0041005 | A1* | 2/2014 | He | H04L 63/08 726/7 |
| 2014/0066025 | A1* | 3/2014 | Maria | H04L 51/38 455/413 |
| 2014/0077673 | A1* | 3/2014 | Garg | G06K 9/00053 312/237 |
| 2014/0129826 | A1* | 5/2014 | Mendelovich | H04L 63/0428 713/155 |
| 2014/0157384 | A1* | 6/2014 | Stern | G06F 21/32 726/7 |
| 2014/0159911 | A1* | 6/2014 | Gray | A61B 5/0024 340/870.01 |
| 2014/0165171 | A1* | 6/2014 | Meng | G06F 21/36 726/7 |
| 2014/0188468 | A1* | 7/2014 | Dyrmovskiy | G10L 17/04 704/235 |
| 2014/0189808 | A1* | 7/2014 | Mahaffey | H04L 63/083 726/4 |
| 2014/0201827 | A1* | 7/2014 | Okazaki | G06F 1/1616 726/7 |
| 2014/0223531 | A1* | 8/2014 | Outwater | H04L 63/0861 726/7 |
| 2014/0269425 | A1* | 9/2014 | Fisher | H04L 41/0809 370/254 |
| 2014/0289833 | A1* | 9/2014 | Briceno | H04L 63/08 726/7 |
| 2014/0297528 | A1* | 10/2014 | Agrawal | G06Q 20/40145 705/44 |
| 2014/0307107 | A1* | 10/2014 | Yang | H04N 5/04 348/194 |
| 2014/0310778 | A1* | 10/2014 | Zhang | H04L 63/102 726/4 |
| 2014/0313007 | A1* | 10/2014 | Harding | G07C 9/00158 340/5.52 |
| 2014/0325628 | A1* | 10/2014 | Huang | H04L 63/0853 726/7 |
| 2014/0347479 | A1* | 11/2014 | Givon | G06K 9/00342 348/143 |
| 2014/0366111 | A1* | 12/2014 | Sheller | H04L 63/08 726/7 |
| 2015/0067772 | A1* | 3/2015 | Paek | H04L 63/20 726/2 |
| 2015/0180866 | A1* | 6/2015 | Hama | G06K 9/00087 726/6 |
| 2015/0208945 | A1* | 7/2015 | Lux | A61B 5/0507 600/430 |
| 2015/0235474 | A1* | 8/2015 | Mullins | G06T 19/006 345/419 |
| 2015/0254443 | A1* | 9/2015 | Blessing | G06F 21/32 726/7 |
| 2015/0254492 | A1* | 9/2015 | Aoki | G06K 9/00033 382/115 |
| 2015/0339658 | A1* | 11/2015 | Leroy | H04B 13/005 705/44 |
| 2015/0340066 | A1* | 11/2015 | Lokshin | G11B 27/031 386/201 |
| 2015/0341356 | A1* | 11/2015 | Dong | H04L 63/0884 726/7 |
| 2015/0347938 | A1* | 12/2015 | Frederico | G06Q 10/0637 705/7.36 |
| 2015/0358318 | A1* | 12/2015 | Spio | H04L 63/0861 726/7 |
| 2015/0358333 | A1* | 12/2015 | Cronin | H04L 63/0861 726/7 |
| 2015/0379254 | A1* | 12/2015 | Matsuda | G06K 9/00892 726/19 |
| 2016/0036801 | A1* | 2/2016 | Caldwell | H04L 63/08 726/6 |
| 2016/0036811 | A1* | 2/2016 | Shim | G06F 21/6245 726/7 |
| 2016/0050209 | A1* | 2/2016 | Govande | H04L 63/101 726/7 |
| 2016/0055343 | A1* | 2/2016 | Coard | G06F 21/31 726/7 |
| 2016/0063268 | A1* | 3/2016 | Cheatham, III | G06F 21/10 726/28 |
| 2016/0087991 | A1* | 3/2016 | Matsuoka | G06F 21/32 726/4 |
| 2016/0099932 | A1* | 4/2016 | Nishikawa | H04L 63/083 726/4 |
| 2016/0140379 | A1* | 5/2016 | Pedersen | G06K 9/00919 726/19 |
| 2016/0140390 | A1* | 5/2016 | Ghosh | G06K 9/00597 348/78 |
| 2016/0149894 | A1* | 5/2016 | Jneid | H04L 63/083 726/7 |
| 2016/0164850 | A1* | 6/2016 | Chauhan | H04L 61/2007 726/7 |

(56) References Cited

U.S. PATENT DOCUMENTS

| | | | |
|---|---|---|---|
| 2016/0171195 A1* | 6/2016 | Moloian | G06F 21/31 |
| | | | 726/19 |
| 2016/0182479 A1* | 6/2016 | Kaplan | H04L 51/046 |
| | | | 726/6 |
| 2016/0197917 A1* | 7/2016 | Lee | H04L 63/0861 |
| | | | 726/7 |
| 2016/0308859 A1* | 10/2016 | Barry | H04L 63/0861 |
| 2016/0357451 A1* | 12/2016 | Chen | G06F 3/0611 |
| 2017/0161750 A1* | 6/2017 | Yao | G06Q 20/40145 |
| 2017/0257229 A1* | 9/2017 | Fisher | H04L 41/0809 |
| 2017/0264611 A1* | 9/2017 | Alen | H04L 63/10 |

\* cited by examiner

SECURE AND SMART LOGIN ENGINE

FIELD

The present disclosure is in the field of security, and more specifically, pertains to a login engine and techniques for a secure and smart login.

BACKGROUND

Significant legal and technical challenges exists with respect to protection of customer information, increasing incidents of fraud in banking sectors such as identity theft, as well as with other economic sectors, and the introduction of authentication technologies. Banks, for example, along with other businesses are recommended to conduct risk-based assessments, evaluate customer awareness programs, and develop security measures to reliably authenticate customers remotely accessing their internet-based financial services. A typical user can possess many different login names and associated login passwords, which are often alpha-numeric strings of characters or symbols. Single-factor authentication mechanisms as such as these continue to be inadequate for high-risk transactions involving access to customer information or the movement of funds to other parties.

Thus, there is an increase in demand for authentication techniques employed by business institutions to be appropriate to the level of risks associated with those products and services associated with user activities. Although account fraud and identity theft are frequently the result of single-factor (e.g., ID/password) authentication exploitation, even biometric security such as fingerprinting, is not altogether complete in security with associated user name and passwords. Where risk assessments indicate that the use of single-factor authentication is inadequate, financial institutions could implement multifactor authentication, layered security, or other controls reasonably calculated to mitigate those risks.

DETAILED DESCRIPTION

Figure 1:
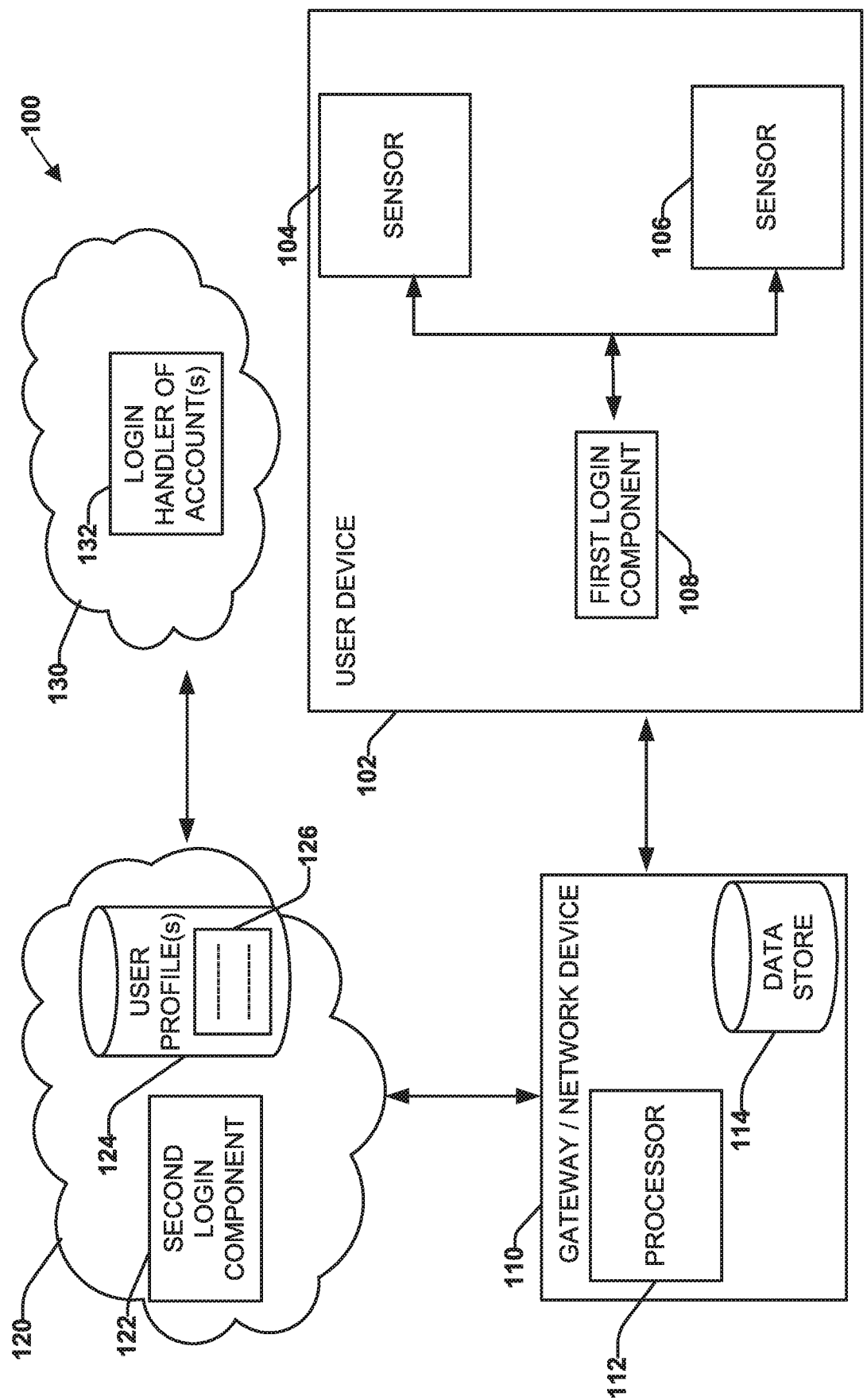
FIG. 1 is a block diagram illustrating a login engine system or device according to various aspects described.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

INTRODUCTION

In consideration of the above described deficiencies of radio frequency communications and authentication operations, various aspects for a login engine or a login engine system in a user device (e.g., a tablet, smartphone, notebook, mobile phone or other wireless device) are disclosed. A login engine can be communicatively coupled to a login handler of one or more user accounts, which can be under control of an account's company or server, and can enable access to the user's account based on the operations of the login engine. The login engine can be separated into two parts or components, a physical login engine (as a first login component) and another login engine (second login component) that are communicatively coupled to one another in the same device or a plurality of network devices.

In one example, the first login component can be located in the user device, while the second login component can be located in a different location such as in a secured cloud storage or cloud server as a virtual login engine component) that serves as an intermediary login engine between user device and login handler components of a server or business site. Although these locations are examples, components herein can be integrated separately/together or part of other network devices such as a home gateway, router, other cloud or user data base in an account server or the like in order to facilitate/enable a sequence or series of login stages, states or phases. Such access can include a user universal access, which can be to both network device(s) and corresponding user accounts managed by a login handler or account handler of a a third party, for example.

There can be a variety of technologies and methodologies that financial institutions or other account handlers (e.g., account servers, user profile data base controllers, application software and corresponding processing circuitry of the application, or the other similar network devices) can use to authenticate customers, users, user accounts, or user devices associated with users/customers. These methods can additionally include the use of customer passwords, personal identification numbers (PINs), digital certificates using a public key infrastructure (PKI), physical devices such as smart cards, one-time passwords (OTPs), USB plug-ins or other types of "tokens", transaction profile scripts, biometric identification, or others, for example. The level of risk protection afforded by each of these techniques can vary, but none of them are completely adequate alone or in combination.

Accordingly, the login engine being disclosed can be configured according to various aspects or embodiments that include receiving sensor data related to user device sensors of a user device, which can operate in response to different physical properties (e.g., light, pressure, audio, visual, motion, distance, or the other physical properties). The received sensor data can be partitioned or extracted to obtain a content data as well as individual characteristic data, which relate to a same or similar physical property and also can be associated with the operation of one or more same sensors of the user device. Content data, as referred to herein, can refer to the the substance of detected information within the sensor data from a sensor of a physical property, such as with a sequence or message content of the conveyed information associated with one or more individual characteristics being detected as related to the physical property. In contrast, individual characteristics (or individual characteristic data) can refer to the sensor data related to data features or data points of physical recognition regarding the individual user as sensed by one or more sensors of the same physical property, or as a function of the individual user attempting access of the user account. The user device can operate with one or more different sensors of different physical properties, respectively, each with related sensor data from which individual characteristic data and related content data can be extracted or detected.

In one example for distinguishing content data and individual characteristic data, the physical property being sensed by one or more sensors can be a vocal/audio property, which can be measured or detected by one or more sensors of the user device (e.g., a vocal/audio sensor). The individual characteristic data could include the data identifying the particular user voice, such as by one or more voice recognition processes, whereas the content data could include the sequence or message audio pattern being conveyed by the user voice having the unique individual characteristic data corresponding to the message/sequence pattern being conveyed. As such, different users can have different individual characteristic data related to unique voices, and the content being conveyed can be a same or different message content (e.g., "Hello Siri, please grant me phone access", or other such content) for login access to the user device as well as one or more user accounts external or internal to a user profile.

For example, an individual user's voice can be identified based on user audio individual characteristic data being compared to a user profile comprising trained data with the particular user's voice identification data associated with the particular user device and one or more user accounts. If substantially matched with the user's voice from a generated comparison, the content of the vocal data can be further compared to the content stored within the user profile also, such as "Hello Phone, please grant me access" or other content data.

Additional sensor data derived from other sensors of the network device can also be obtained, which correspond to different physical properties. This additional sensor data related to other physical properties can likewise have content data and individual characteristic data, which can be extracted and confirmed with a user profile for user access to at least one login phase into the network device as well as one or more associated user accounts. The login phases can include multiple login phases, states or stages in one or more different combinations or sequences of success determinations as disclosed herein.

Any combination of content data or individual characteristic data from one or more different sensors of the network device can be utilized for user access. In one example aspect, sensor data including content data and individual characteristic data from one or more sensors can be also used for making a synchronicity determination. The sensor data can be from sensors related to different corresponding physical properties or the same, for example. In response to the synchronicity determination between sensors satisfying a synchronicity threshold or being substantially synchronous between one another (e.g., between audio sensor data and video sensor data, or between distance data and audio sensor data, or other combinations of sensed physical properties), then the user login engine can additionally further generate successful access to another login phase into the user device or the one or more user accounts. Additional aspects, embodiments or details of the disclosure are further described below with reference to figures.

FIG. 1 schematically illustrates an exemplary login engine system 100 that enables user access to one or more user accounts and devices via a user device within a wireless network. The login engine system 100 can comprise login components, including the first login component 108 and the second login component 122, which can be communicatively coupled to one another while being integrated with or housed in one or more components of the system 100. Alternatively, both components can be integrated at a cloud or gateway device or communicatively coupled across components of the system as illustrated in FIG. 1, as the first login component 108 and the second login component 122. These login components 108, 122 can operate in conjunction as a login engine or login engine device, in which one can comprise a physical (PHY) layer of an open system interconnection (OSI) communication model while the other can comprise one or more upper layers. The system 100 can enable secure user access to the user device 102 itself as well as one or more user accounts 126 by utilizing one or more different sensors 104 and 106 at the user device 102 for various login states.

The login engine system 100 can include the user device 102, which can comprise a mobile device a tablet, smartphone, notebook, mobile phone, user equipment, home gateway, other mobile/communication/network device, or any power consuming device of home associated with a user access mechanism. The user device 102 can be communicatively coupled to a network device 110, which can include a home gateway device, base station (e.g., evolved node B or eNB of a wireless network) or other network device (e.g., a secondary cell network device, router, or the like) via a wireless or wired connection.

The user device 102 can include other components (not shown) such as processors, memory, in addition to sensors 104-106 for detection of sensor data or status data related to the environment or a physical property, or other components. In other examples, the user device 102 can be any wireless device or energy consuming device, which can be associated with a user profile stored at data storage and at least one of a refrigerator, an HVAC system, a microwave, toaster, or any energy consuming device capable of having power consumption measured thereat. The user device 102 or network device 110 can also be one or more controllers, or other energy consuming devices, including one or more appliances or in some cases on site electric/energy generation devices (e.g., solar panel devices, geothermal devices, and the like) or energy storage devices (e.g., battery, capacitor, etc.) that are communicatively connected in wireless home network via a gateway 110 that can comprise a gateway device, internet of things (IoT) specific gateway for a set of home user devices, a multi-protocol repeater, a data computing cloud server, a processor 112, a data store 114 or other component for processing data, routing, or communicating data for the user devices 104-106.

The user device 102 can include a browser for interacting over the network 112, which can include a wide area network, a local area network or some other network for interfacing with an account server or login handler component on a corresponding website. The user device 102 can further include different channel inputs and outputs for communication in order to communicate in various means, pathways, protocols or data formats corresponding to one or more channel protocols for data delivery. For example, the user device 102 can communicate via short message services (SMS) according to global system for mobile communications (GSM) series of standards or other standards for other broadcast messaging, via a radio link for calls, multimedia messaging service (MMS), email, internet access, short-range wireless (e.g., infrared, Bluetooth), or other messaging channels or data delivery service protocols, for example.

The network device 110 can further be communicatively coupled to a data and cloud network/storage 120 of a cloud server, or be configured to generate the cloud network/storage as a server device, base station or eNB of a wireless network. The cloud server 120 can also be coupled to one or more other cloud networks or cloud storages of other cloud servers 130 corresponding to and encrypted by one or more accounts 126 of one or more user profile(s) 124 for access or customer service (e.g., a banking/application/shopping/or other account that can be secured or have secure login protocols for access) in a data store or database.

The user profiles 124 can be updated or configured in a data store of a cloud storage 120 or cloud network that can be generated by a different network device (e.g., a cloud server or other server) or could be enabled by the network device 110, for example. The user profiles 124 can include user accounts 126 that correspond to one or more proprietary services or management entities, such as a banking server, customer server, associated website, an application customer service for a software application, device drivers, or other customer accounts associated with the user device 102 of user, for example.

In an aspect, the user profiles 124 of the cloud 120 can be configured to be trained with various kinds of sensor data, which can include or embody extracted individual characteristic(s) (individual characteristic data) and content data. The individual characteristic data and content data related to various physical properties can be obtained or trained in the user profile 124 for visual/optical recognition of a user in response to a login request. Sensor data can be predetermined based on the particular user, in which the gateway device 110, other network device (e.g., a server) or login handler 132 of a manufacturer, banking/customer account server, or cloud 130 can operate to configure by training one or more filters for generation of the user profiles 124 or providing external data to the data store of the user profiles 124. Trained filters, for example, can operate to identify particular data points, traits, property cues, or physical properties, each related to a user and can correspond to physical properties such as voice, optical recognition features, movements, visual data, other biometric identification, distances from the device, loudness or other physical properties (e.g., pressures, accelerations or the like) for login recognition at a login request. Although specific examples of sensor data related to audio and visual properties or related cues (e.g., voice and facial recognition) are discussed herein, other physical properties can also be envisioned as one of ordinary skill in the art could appreciate.

In another example, the user profile 124 can be trained with, or include characteristic data related to a particular user's voice and voice recognition, as well as characteristic data, for example, related to a user's movements and visual recognition or facial recognition features, in which content can be data corresponding to or conveyed by the movements. As such, the user profile 124 can be trained with or include content data that corresponds with each of the same physical properties that the individual characteristic data relates to. The content data can include message sequences forming content that could be derived from the individual characteristics of the physical properties, respectively, for example.

As an additional example, a user's voice can be recognized as corresponding to a particular user as a function of the individual characteristics being detected, which can involve (pitch, tone, inflection, volume, etc.) while the content being delivered by the user's voice can be the message or sequence of data deriving from the voice or other related physical property (optical/visual data, distance, movement, or other user physical properties) that conveys content or meaning. For example, an individual can be identified as having a user profile 124 that contains individual characteristic data associated with the user John Doe according to one or more physical properties, while the content of the audio data from John Doe could be "Hello phone, please provide me access" or some other more inconspicuous message for security. Consequently, if any one of content data or individual characteristic data do not satisfy a threshold of similarity with similar, corresponding data of the user profile, then a login state does not progress, or a login stage is unsuccessful, thereby preventing device or account access.

The user profile 124 can be further trained with characteristic data and content data related to other physical properties of a particular user for login engine operations. For example, various physical properties such as optical or visual data can be trained into the user profile 124 via one or more login handlers 132, processor(s) of the network device 110, the cloud server 120, or other component (e.g., user profile component 208 of FIG. 2). In a similar manner as discussed above with respect to audio data being sensed and processed as sensor data from one or more sensors (e.g., sensor 104), another sensor (e.g., sensor 106) can operate to detect other sensor data related to another physical property such as visual, optical, or other physical property of a user or a user device surrounding environment in response to a login request or trigger. The individual characteristic data and content data related to optical or visual properties can be obtained for visual/optical recognition of a user in response to login request. These individual characteristics can be identification of facial cues, facial movements, or facial recognition, for example, as corresponding to the visual/optical property and can be at least part of a corresponding trigger initiating a login request, for example. Likewise, the extracted/mapped content data can be the message, sequence or patterns being conveyed by the movements.

Each of the sensors 104 and 106 of a user device 102 can thus be used to obtain individual characteristic data and content data related a different physical property in response to a login request at the user device 102 and with one or more sensors 104-106. The data obtained in response to a login request can be ascertained at the user device 102 and then used to further generate comparisons to the trained data of an associated user profile 124. If the content data or individual characteristic data satisfy a predetermined threshold of similarity resulting from the comparison, then a successful login or login phase from among various login phases for user access can be generated. Any combination of successful comparisons being performed by the first login component 108 or the second login component 122 can be used to generate a successful login phase of the user device as well as to one or more user accounts 126.

In another aspect, the first login component 108 can operate to identify or map features, traits, cues, signal points or data points, functions or other properties of the sensor data being received via the sensors 104-106 or other sensors to extract individual characteristics or related content data. The first login component 108 can further operate to compare this data to the stored sensor data in a user profile 124 or other external user data set. The first login component 108 can be configured to then further determine whether one or more thresholds for similarity are satisfied. In response to the threshold(s) being satisfied, the first login component can generate a successful login as part of one or more different login phases/stages.

For example, a vocal tone can be identified from a user via the sensor 104, while an optical scan or video can be identified from a user via another sensor 106, in response to a user login request of the user device 102, cloud storage 122, user profile 124, user accounts 126 or cloud 130 with login handler 132. The first login component 108 can receive the sensor data, determine from the sensor data of each related physical property the content data and individual characteristic data, and further extract or map data points (e.g., optical points, audio points, other properties or functions, or the like) from the sensor data of sensors 104-106 in response to a user login request at the network device 102. The first login component 108 can then generate one or more comparisons between individual characteristics or data content related to physical properties and one or more sets of individual characteristics or data content stored in a user profile 124 or other memory. In response to the first comparison and the second comparison satisfying predetermined thresholds, respectively, the first login component can enable a successful login stage, which can be one of a plurality of login stages of the network device or system 100.

Figure 2:
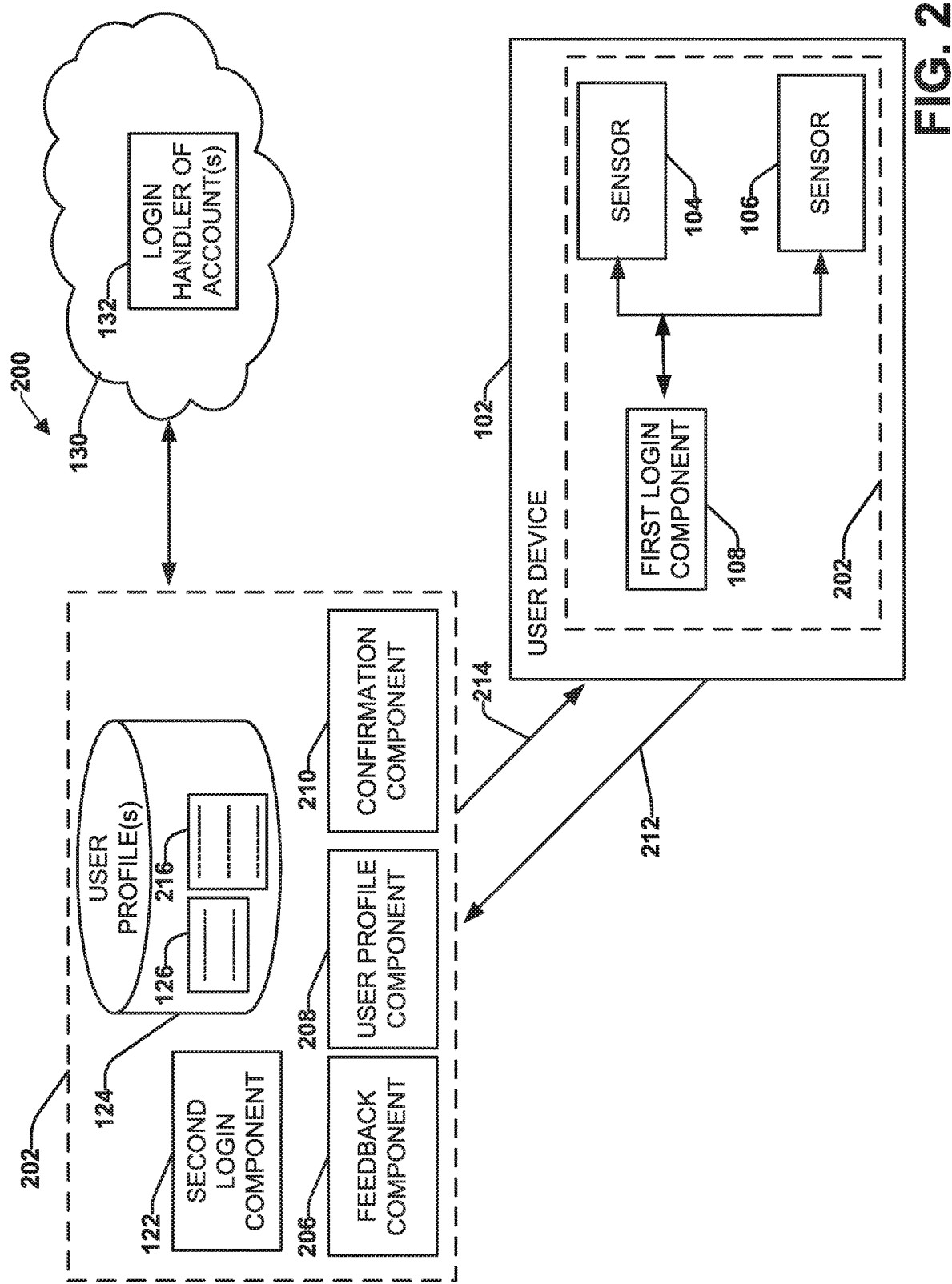
FIG. 2 is another block diagram illustrating login engine system or device according to various aspects described.

In another aspect, the second login component 122 can be communicatively coupled to the first login component 108 via the gateway device or other network device 110 with a wired or wireless connection (e.g., wireless connection 212 of FIG. 2). The second login component 122 can be configured to generate a synchronicity determination between at least two of: the one or more first individual characteristics, the one or more first content data, the one or more first individual characteristics, or the one or more second individual characteristics, based on whether first sensor data aligns with second sensor data according to a predetermined synchronicity threshold. For example, the synchronicity determination can be between first sensor data of the first physical property (e.g., audio) detected by a first sensor and a second sensor data of the second physical property (e.g., video) detected by a second sensor, in which sensor data from each can include related individual characteristic data or content data. The second login component 122, in response to the synchronicity satisfying the synchronicity threshold between different sets of data (content data/individual characteristic data) of the same sensor or of different sensors related to a different physical property, further enables another successful login stage of the network device 102.

In one example, if a user's facial movement corresponds to the content being detected as generated from the facial movement, audio voice corresponds with the audio content being generated, or both facial movement and content message correspond as being concurrent or simultaneous to the audio voice and audio content, then a synchronicity threshold could be satisfied. As a result, the second login component 122 can further enable and additional login stage/phase or be a part of one login request process related to accessing the network device 122, the cloud 120, user profile 124, user account 124 or other user account handled or being managed by the login handler 132, for example.

Referring now to FIG. 2, illustrated is another login engine system 200 that can enable login requests to a network device as well as to related user accounts of other system components. The system 200 includes similar components as discussed above in FIG. 1, and further includes the login engine component 202, which can include the first login component 108 and the second login component 122 as well as possible other components (e.g., one or more sensors 104-106) communicatively coupled to one another. Although the first login component 108 and the second login component 122 are illustrated separately, each can be located together or separately as part of other components (e.g., the gateway 110 of FIG. 1, the network device 102, cloud 130, the login handler 132 or the other component).

The system 200 can further include a network device 202 (e.g., a cloud server) configured to generate a cloud storage (e.g., cloud 120). The network device 202 can further include the second login component 122, the user profile or profile storage 124, and one or more user accounts 126, which can correspond to one or more user accounts that can be managed by the login handler 132 of the cloud/server 130. The network device further includes a feedback component 206, user profile component 208, or confirmation component 210.

The feedback component 206 can operate to generate a feedback message related to a login request via the user device 102 or other network device 202. The feedback message can include one or more of a network device identification (ID), a current location, a current time, an account identification, an execution status or a login engine identifier, for example, based on, or related to, the login request at the user device 102. For example, if the first login phase, including content data, individual characteristic data, or both sensed by one or more sensors 104-106, which correspond to one or more physical properties for measure or detection, does not satisfy a predetermined threshold for a comparison between the stored data in the user profile (e.g., stored user profile content data or individual characteristic data), then a failure attempt can be sent as feedback to the user device 102 via the feedback component 206 with a different link, path or channel 214 that is different in format or protocol as well as different in link, path or channel than the path 212. Alternatively, a successful login request can be generated as part of the feedback message to the user device 102.

Additionally or alternatively, the feedback component 206 can communicate whether or not a synchronicity was determined or not based on a synchronicity threshold utilized by the second login engine component 122. For example, if vocal data corresponds with visual data is above the synchronicity threshold indicating a level of sequence or timing of the data between the two sensors as close in time, similar concurrent or simultaneous, then the data from different sensors 104-104 can be considered as synchronous and being from the same user and data from sensors at the same or about the same time. Satisfaction of the threshold or a determination of synchronicity can thus also be communicated via the feedback component 206 as successful additional login attempt or phase from among different login phases. Alternatively or additionally, a failure attempt could be indicated where the sensor data of different sensors were determined as asynchronous.

In another embodiment, the feedback component 206 can further communicate the feedback message via a different feedback path 212, channel or protocol than the data (e.g., sensor data from sensor 104 or 106) being communicated via the user device 102. For example, if the sensor data is being communicated via one communication path 212 such as from a gateway device (e.g., 110 of FIG. 1), router, or wireless (e.g., WiFi, long term evolution (LTE) link, other cellular link, other communication protocol/channel, or wired connection), then the feedback message sent via the feedback component 206 can send the feedback message by a different path, channel or protocol, such as via text, short message service (SMS), multimedia message service (MMS), electronic mail (email) or other path.

In another embodiment, the feedback component 206 can communicate the feedback message based on a communication address (internet protocol address) or a designated communication path designated in the associated user profile. A user or account manager can provide the email or choice of path that the feedback message can be sent for security and further determine a level of security within the user profile. A level of security for example to be determined or set can comprise any combination of first set (one or more) of individual characteristics, a first set of content data, a second set of individual characteristics or a second set of content data, in which the first set and the second set of data can correspond to different physical properties sensed by the sensors 104-106, for example.

Additionally or alternatively, different login states or phases can be deemed successful based on one or more successful thresholds or comparisons of any combination of the first set of sensor data, the second set of sensor data, or addition or other sensor data, including corresponding individual characteristic data and content data, for example.

In addition, the first physical property and the second physical property can comprise different physical properties based on user property selections of the associated user profile comprising at least two of a user video visual property, a user audio property, a distance property or other physical property related to the user and one of the sensors 104-106. This can be facilitated or enabled by the user profile component 208. In addition, the user profile component 208 can generate or train the associated user profile. For example, the user profile component 208 can process a stored set of individual characteristics or content data in the associated user profile 124 in a data store or the user account 126 by being initially trained via one or more filters such as by artificial intelligence processes, including fuzzy logic, expert system processes, neural processes, or other similar artificial intelligence operations. The user profile component 208 can enable the associated user profile 124 to access different user login accounts 126 associated with the associated user profile in response to the successful login stages of the network device 102.

In another embodiment, the user profile component 208 can operate to control or generate the user profile 124 as a data store that comprises different partitions 214. In a first data base or partition, for example, the data sets or partitions of the data store 124 can comprise a separate or integrated data storage with look up tables for doing user-specific checks/reports/execution associated with sensor data being organized and communicated from the first login component 108 to the second login component 122. In a second data base or partition, the user profile data store 124 or a separate data store can include generic configuration and algorithms for second login component 122 operate (e.g., control and operation data). In a third data base or partition, the user profile data store 124 or a separate data store can include data for communication with login handler of account which contains account-specific items but not user-specific items (e.g., second login account data).

The first partition of partitions 214, for example, can include registered locations from where login requests have been sent from in past attempts, registered device IDs (e.g., user device 102) from which login requests have been sent so far, a registered phrase for doing the match checks or comparisons for any one of content data or individual characteristic data related to different sensor physical properties, or other information related to the sensor data. Additionally, the user profile or first partition can include trained characteristics profile of a sensor A (e.g., sensor 104) information for doing the match checks, such as a speaker/user voice recognition profile, and a trained characteristics profile of sensor B (e.g., sensor 106) with information for doing the match checks, such as a speaker face parts/movement recognition profile. The partition 214 can further include trained synchronicity (sync) alignment information between sensors A and B (e.g., sensors 104 and 106) such as sync alignment between voice and face parts movement of a user. Registered login credentials for user accounts can also be stored here such as a login name and password for each account used by the second login component 122 for login at the corresponding account's login handler 132. Other data can include a ring buffer with identification data of the last n login requests, such as the user device ID, current location, current time, account, execution status (e.g. in process/successful/failed with reason code) of the login requests. A registered target for encrypted notification can also be included, such as an email account, and its configuration (email subject, items of the request which can be included in the indication and which not).

The second partition of the partitions 214 can include another data base or data set with one or more process(es) for content recognition, characteristics recognition, sync recognition, a user selection of sensors to be used for determining successful login stages, as well as a selection of one or more checks or combinations of checks to be applied. Additionally, one or more process(es) for indications handling and configuration for the handling as well as one or more process(es) for generation of strong passwords, or other data can be included.

The third partition of the partitions 214 can include a unique identifier of the second login component 122 to be used with one or more particular accounts (e.g., x, y, z), which can have the same identifier for each account, for example. A login name/password rule for account x, y, z, as well as a login change procedure for account x, y, z, can be included.

As a further login phase or stage, the confirmation component 210 can generate an additional stage login determination of whether one or more of a current location, a current time, an account, an execution status or a login engine identifier, associated with the network device, substantially match the associated user profile. For example, the confirmation component 210 can be configured, in response to the first or second successful login stage of the plurality of login stages, can determine whether a current location, a current time, an account identification (password/username, or account match to data entered via the sensors or network device identification data), a login execution status or a login engine identifier, as associated with the network device 102, substantially match data of the user profile 126. In response to the second or subsequent stage login determination satisfying a predetermined threshold, the confirmation component can further enable another successful login stage of the network device 102. As one of ordinary skill in the art can appreciate any one or more of the login stages disclosed can be implemented as a successful user login in response to a login request as disclosed herein.

The confirmation component 210 can further enable a registration of data that can be done manually by a user via a secure connection between the user device 102 and the second login component 122 or can be done by the second login component 122 with user's confirmation of a new registered location or new registered device ID, for example. Thus, the components of the login engine 202 for the user device 102 login can also enable an automatic login to one or more accounts of the login handler 132 via operations of the second login component 122.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 3:
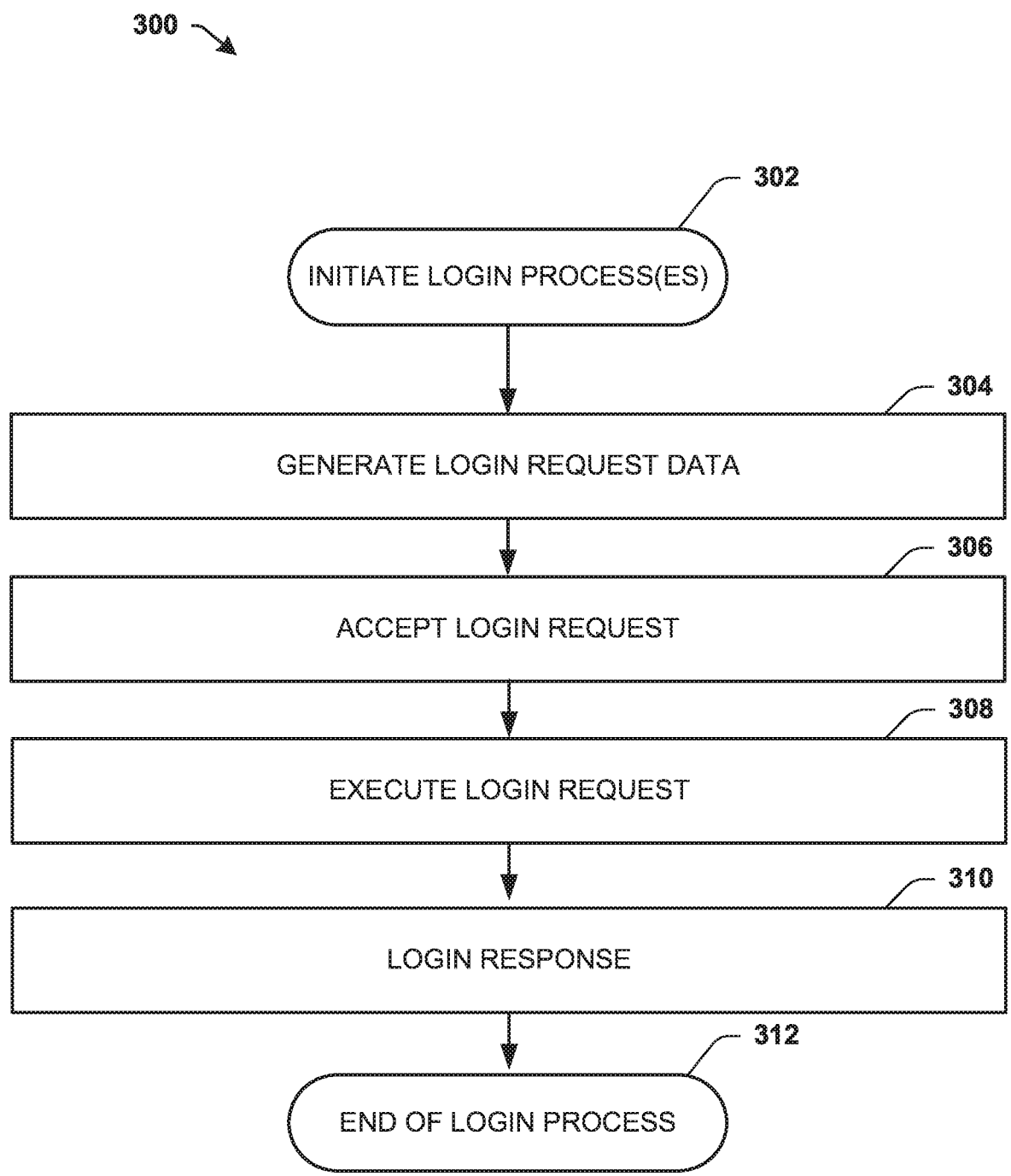
FIG. 3 is a block diagram of a process flow for a login engine according to various aspects described.

Referring to FIG. 3, illustrated is a method 300 employed in a login engine system for secure and smart login processes via a user device (e.g., 102 of FIG. 1. The methods herein will reference FIGS. 1-2 for example and ease of description. The method initiates at 302 with a trigger event that initiates a login response at a user device (e.g., 102). This trigger event could be any indication by a user at the user device 102 to initiate a login request to have access to the user device 102. The same access could enable access to other user accounts 124 that reside on the cloud 120, network device or another cloud (e.g., 130) that can be different from the one determining the successful login stages or access. A successful login request could enable access to the user accounts 124 as well as access to the the user device 102 itself.

In one example, the trigger that starts the login process/request can be a dedicated phrase, sequence of messages involving audio content from the user, or set of physical movements. This content data can be sensed by sensors 104-106 of FIG. 1 or 2, for example, which can trigger sensors 104-108 to operate and the first login component 108 to receive, and then analyze sensor data related to one or more physical properties.

At 304, the first login component 108 operates to generate the login request by receiving, obtaining, categorizing or organizing the sensor data. The first login component 108 further packages and communicates the sensor data to the second login component 122. This data, for example can be sent via a wired or wireless connection via an eNB, gateway device or other network device 110, for example. This data can include content data, individual (user) characteristic data to be further analyzed for a match or a substantial similarity to user data stored in a user profile 124, for example. The data can be further categorized or identified to convey timing, location, distance, one or more of a network device identifications (IDs), a current location, a current time, an account identification, or other data based on, or related to, the login request or the user device 102 for confirmation or determination of the user access.

At 306, the login data sent by the first login component 108 can be received at the second login component 122, and the login request acceptance can be processed in order to determine a successful login or login stage(s), for example. The login can be processed thus as a two level approach with multiple login stages where one or more comparisons of the content data or individual characteristic data can be performed. Login execution can then be generated by the network device 110 via the second login component 122 in response to the various login stages or phases being successful or the accumulation of the sensor data at the first login component 108 completed.

At 308, execution of the login response can be performed. For example, individual characteristic data of one or more sensors 104-106 can be compared to trained data in the user profile or data stores 124. A determination can be made as to whether each kind of sensor data substantially matches the data that is trained within the user profile 124. Sensor data (content data and individual characteristic data) can be analyzed for such comparison matching form various sensors, such as audio, video, distance or other sensors for determining/measuring related physical properties.

As a second login stage or phase, the second login component 122 can further determine whether the data between two different sensors is synchronous. Whether the data is synchronous in timing between one another can be an additional login stage from the comparisons of trained stored data with the sensor data. In addition, a further login stage or phase can be confirmed according to ID, location, or the like based on different data point or signal points between different sensors 104-106. The data can be synchronous based on the sequence of message data or signals corresponding as deriving from the same user, in timing, or other properties that determine synchronicity. As such, the second login component executes the login according to one or more different thresholds being satisfied or not, such as via matching stored data or data being dynamically obtained by the sensors in response to or at the login request of a user via the network device 102, which are part of various login stages or phases. These login stages or phases can be determined at different times, concurrently or simultaneously in time.

At 308, login execution can be generated by the network device 110 or the second login component to determine response to the various login stages or phases being successful or the accumulation of sensor data at the first login component 108 as being completely communicated by the first login component. For example, the feedback component 206 and the confirmation component 210 can operate to execute operations as discussed herein. Various identification data or other data discussed herein can be further utilized as part of the confirmation process to identify the user or the user device 102 as well, which can utilize additional sensor data with a distance measure between the user and the user device 102, the user device ID, location or the like. Additionally or alternatively, these login stages or phases can be utilized in the first login component 108 or in the second login component 122 in one or more different combinations according to the login engine architecture, at a user request, or a request from the login handler 132, for example.

At 310, a feedback message can be sent via the feedback component 206 to the user based on one or more internet addresses or other message service, which contains any of the information including a successful or unsuccessful login attempt or request, the location, time, device ID, or the like. This message can be a detailed message informing the user based a selected communication path indicated by the user in the user profile for receiving a detailed message about any login request.

As stated above, the communication path 214 for the feedback message can be a different path from the path 212 that the sensor data from the first login component 108 is communicated. This can be selected by a user as a user option, and can include, for example, an email, an SMS, MMS, or other channel protocol or communication format different from the sensor data path 212. At 312, the method ends.

Figure 4:
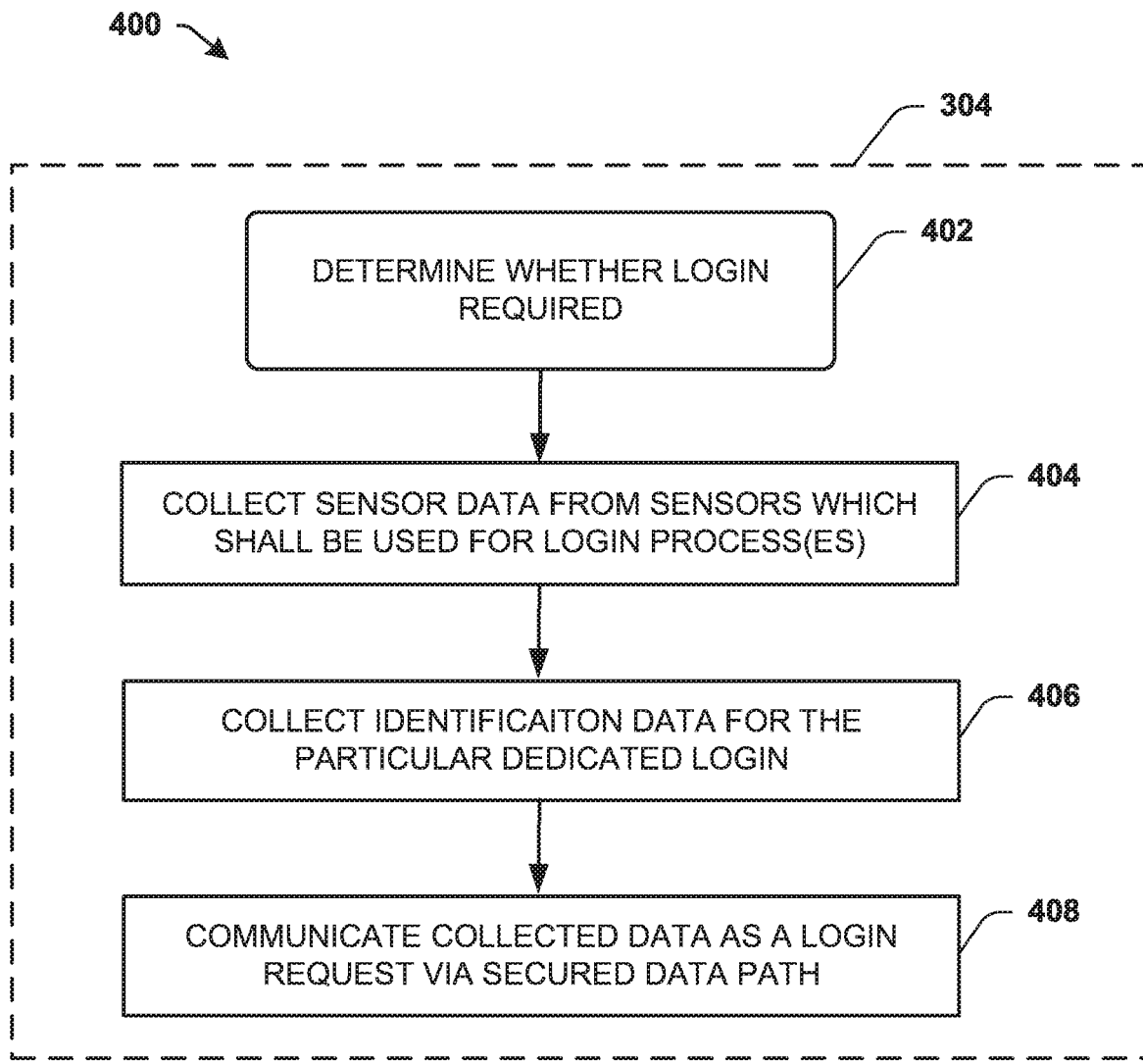
FIG. 4 is a block diagram of a process flow for a login engine request according to various aspects described.

Referring to FIG. 4, illustrated is a method 400 employed in a login engine system for secure and smart login processes via a user device according to further details of FIG. 3 for the login request generation at 304.

At 402, the first login component 108, for example, can determine whether a trigger even (e.g., a voice activation, movement, or other sensor trigger) is being received as a login request or not.

At 404, the first login component 108 can collect sensor from the sensors 104-106, for example, to be used for login phase determinations of success or not. For example, content data, individual characteristic data comparisons, as well as synchronicity between different sensors at the time of the login request or in response thereto.

At 406, the identification data for the dedicated login can also be gathered. For example, additional confirmation data (e.g., distance data, other additional identification data, actual product ID, current location, current time, particular accounts to be accessed, or the like) can be collected, formatted, categorized or identified.

At 408, the collected data can be communicated via a secure data path 212 as a login request to be initiated at the second login component 122.

Figure 5:
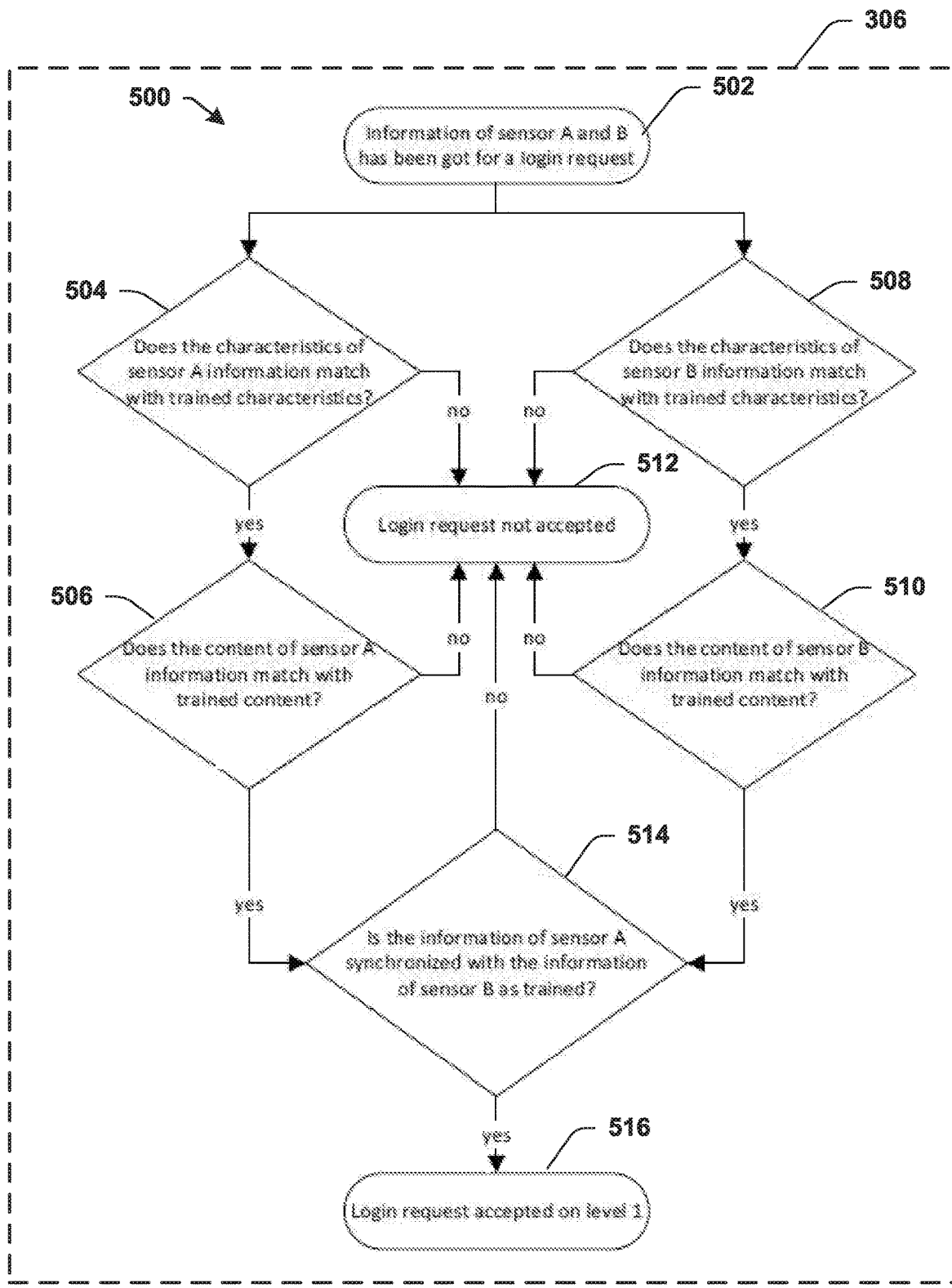
FIG. 5 a block diagram of a process flow for a login engine request acceptance according to various aspects described.
Figure 6:
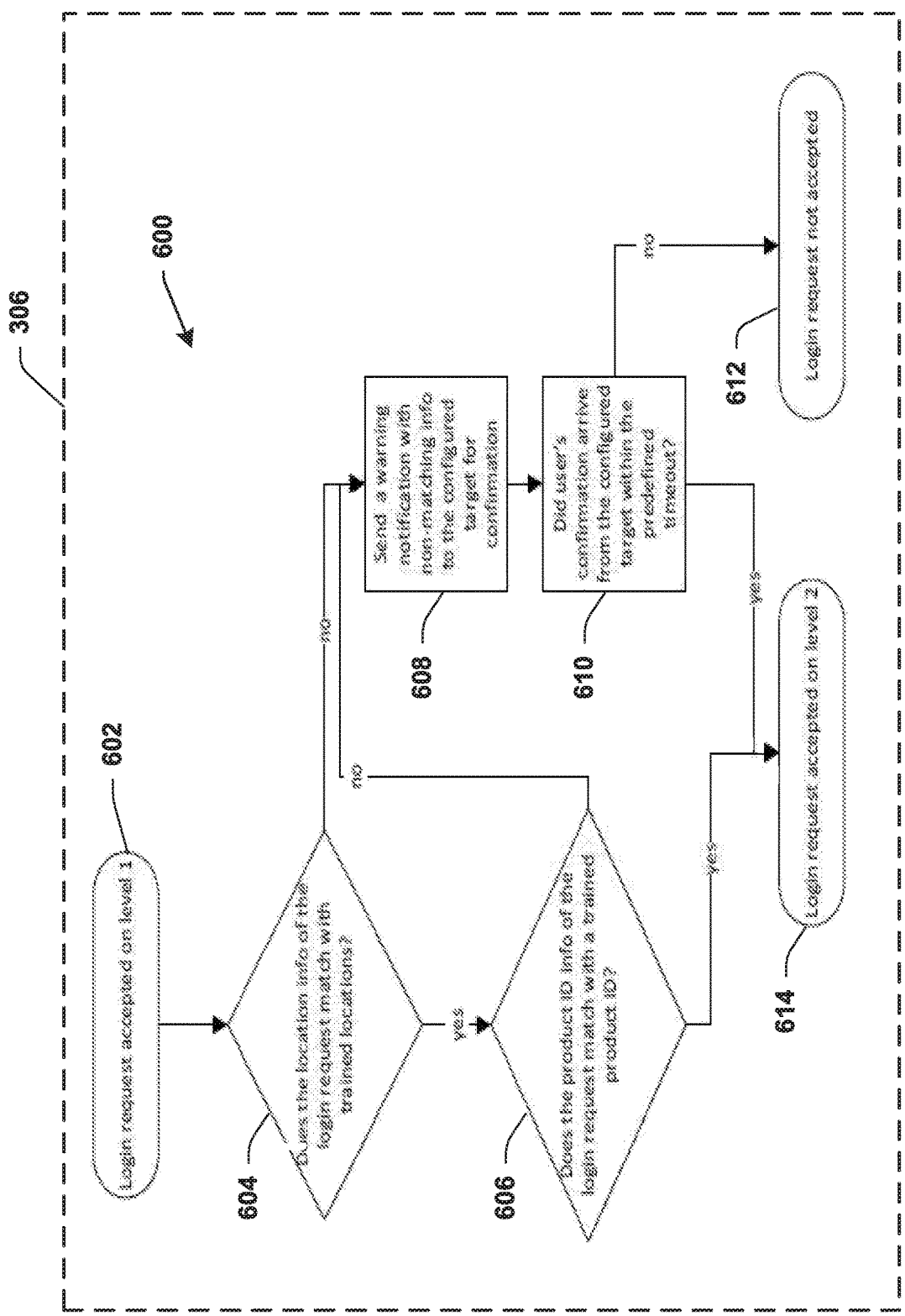
FIG. 6 another block diagram of a process flow for a login engine request acceptance according to various aspects described.

Referring now to FIGS. 5 and 6, illustrated are examples of the login evaluation phases at the second login component 122 as a two level approach utilized at the acceptance of the login request 306 of FIG. 4. The second login component 122 operates to evaluate the login request from the first login component 108 according to trained data stored in the user profile 124

FIG. 5 illustrates a first level phase that includes the collected sensor data from the first login component 108 and FIG. 6 illustrates a second level phase that includes the collected request identification data.

The method 500 includes details of the act 306 of FIG. 3 and initiates at 502 with receiving sensor data from different sensors 104 and 106 corresponding to different physical properties (e.g., audio and visual properties).

At 504, the second login component 122 determined whether individual characteristic data from sensor A (e.g., sensor 104) match (e.g., based on a predetermined threshold) via a comparison with trained or stored individual characteristic data corresponding to the user profile 124. If the determination is "no" then the process flows to 512 with the login request not being accepted. If the determination is "yes", then the process flows to 506 where a second or additional determination can be made to determine by a comparison whether the content of the sensor A information substantially matches (e.g., based on a predetermined threshold) trained or stored content data corresponding to the user profile 124 of the user. If the determination is "no" then the process flows to 512 with the login request not being accepted. If the determination is "yes", then the process flows to 514 or provide an acceptance of a first login state, phase or stage at 516.

Concurrently or simultaneously with the processes or acts 504 and 506, determinations of another sensor B (e.g., sensor 106) can also be made with sensor data including video data or optical data. Comparisons can determined whether substantial matches are present between individual characteristic data and content data with the corresponding trained data in the user profile 124, for example.

If both kinds of sensor data from sensors A and B are successful based on predetermined thresholds for matching data, then at 514 a synchronicity determination can be made via the second login component 122 between the sensor data of each sensor 108, 122. The second login component 122, communicatively coupled to the first login component 108, can generate a synchronicity determination between the first sensor data and the second sensor data based on whether the first sensor data aligns with the second sensor data according to a predetermined synchronicity threshold for one or more data points between the sensors.

In one example, the user device 102 can be a smart phone or wireless device (e.g., a mobile phone) and the login engine 202 can be used for an Amazon account login as well as for other logins, for example. Sensor A (e.g., sensor 102) can comprise a built-in microphone of user device 102, and sensor B can comprise a built-in video camera. The login engine 202 can be trained with the spoken phrase "Hey LE, please execute the login for me", where the first part "Hey LE" can be used just for triggering the start of the login engine, and not for other checks, login states/phases in response to the triggering login request.

Sensor A (e.g., sensor 104) can enable a content check (determination or threshold comparison) that enables a phrase recognition by audio data samples (or sample points). Sensor A can further enable a characteristics check of the individual speaker recognition by the audio samples. Sensor B (e.g., sensor 106) can enable a content check by a phrase recognition by the movement of face parts (lips, tongue or any other additional face parts) in the video samples. Additionally, sensor B can enable a characteristics check of the individual speaker recognition by the movement of face parts in the video samples. The second login component 122 can receive this sensor data as extracted, mapped or detected by the first login component 108 and perform a synchronization check including a recognition that voice of audio samples and movement of face parts of video samples are not out of sync or asynchronous, and thus synchronous where the comparison satisfies a synchronicity threshold, for example. The method 500 can then determine that the Login Request Acceptance Level 1 is successful at 516.

Referring to FIG. 6, illustrated is a process flow that can continue from method 500. Act 602 can be similar to or the same as the act 516 with the second login component 122 indicating a successful login state. In addition, the second login component 122 can determine that the level of security is set at a highest level where the successful login of level 1 or a first login state/phase is successful only one possible with a complete or full check on content data for sensor A (CCa), content data for sensor B (CCb), individual characteristic data for sensor A (ICa), individual characteristic data for sensor B (ICb), and a synchronicity check between any of the sensor data (content/characteristic data) of one or more sensors (Scab). For example, a highest level of security for level one to be received at 602 can be represented as CCa+CCb+ICa+ICb+SCab. Other embodiments can also apply with different or less complete of a security check, according to one or more of the following combinations, for example: CCa+CCb+ICa, CCa+CCb+ICb, CCa+ICa+ICb, CCb+ICa+ICb, CCa+CCb+ICa+ICb, CCa+CCb+SCab, CCa+CCb+ICa+SCab, and CCa+CCb+ICb+SCab.

At 604, the method further comprises a determination of whether additional sensor data (e.g., location info) matches what is trained in the user profile 124 via the second login component 122 or the confirmation component 210, for example.

At 606, the method can include a determination of whether other additional sensor data (e.g., produce or user device ID) corresponding with that which is trained or stored in the user profile 124.

Although the acts 604 and 606 use location and ID data as examples the identification for a login acceptance at a second login level or state can include one or more of the following: an actual product ID (e.g., a unique device ID), a current location (e.g., a user or client's IP address can be utilized for deriving a current location), a current time (e.g., a time as displayed on the device 102 at the time point of request generation), or an account data such as an account information can be derived by the used app or web page for which a login shall be issued. The identification data can further include whether the device 102 is in stand-by mode with WLAN connected. If so, then the default account can be a device account where the login handler 132 is located on the network device 130 (as a server/network device) and not in a cloud (user device wake-up and login via a spoken phrase).

Although the acts 604 and 606 are described as determinations in a subsequent order including location and product/device ID, respectively, other additional data can also be utilized as disclosed above. In response to either acts 604, 606 or both generating a non-passing or unsuccessful determination (e.g., "no"), then the process flow continues at 608 with sending of a warning notification with non-matching information to a configured target for confirmation (e.g., an email address, SMS receiver, IP address, or the like), in which the target can be configured by the user and sent via a separate, different path (e.g., 214). Furthermore, the process flow can continue at 610 with a determination of whether the user's confirmation arrived from the target within a predetermined time out.

If the determination at 610 is "no" then the process flow continues at 612 with a login request not being accepted.

If the determinations at acts 604, 606 or both are "yes", the process flows to 614 where the login request at level 2 is accepted.

Figure 7:
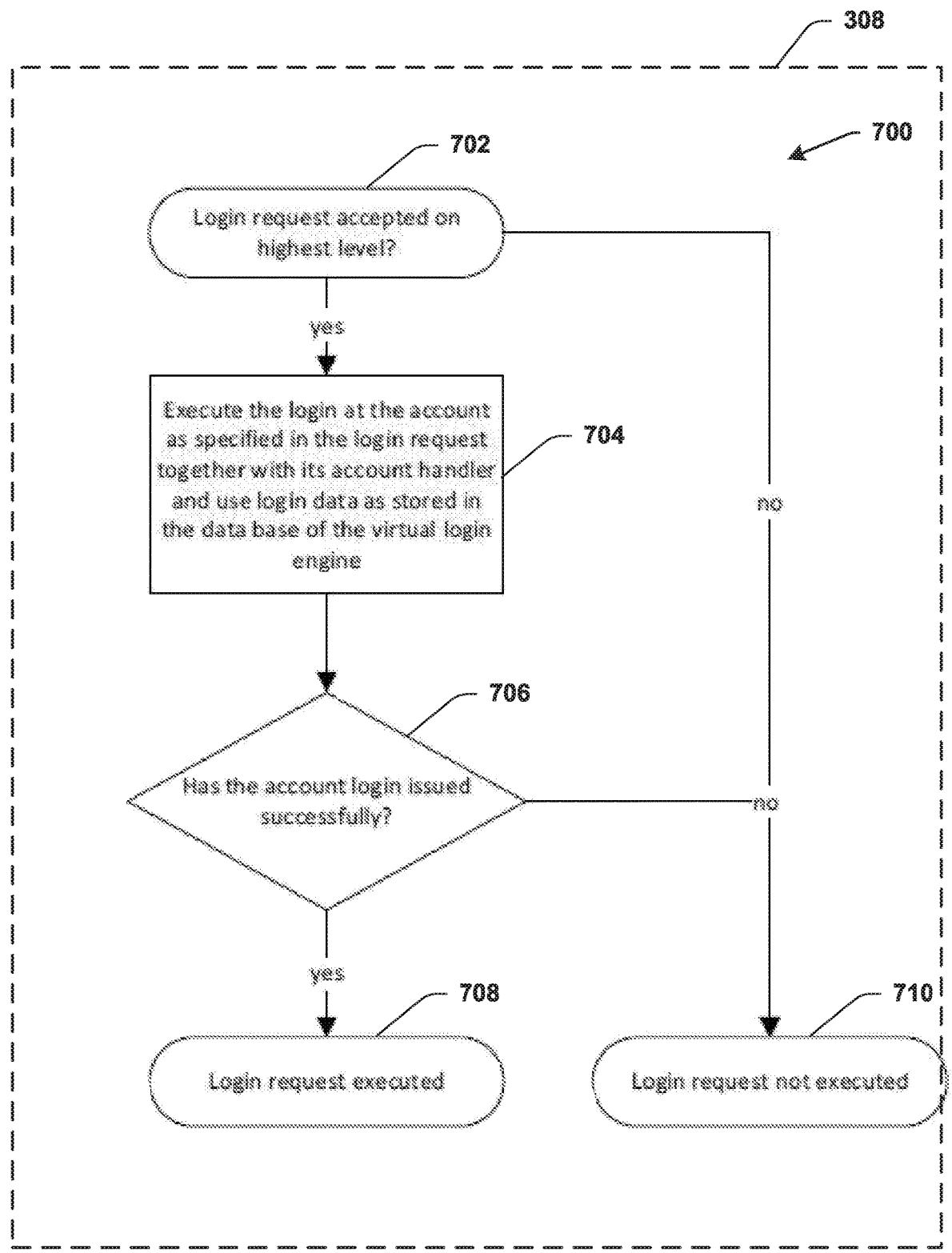
FIG. 7 a block diagram of a process flow for a login engine execution according to various aspects described.

Referring now to FIG. 7, illustrated is a method 700 detailing the act 308 of FIG. 3, for example, as part of a login engine. The method initiates at 702 with a determination of whether the login request was accepted at the level in which the security is set, either by the user, the account handler 132, other entity or network device, or any combination thereof. If a determination is "no", then the process flows to 710 where the login request is not executed. If the determination is "yes", then the process flows at 704 where the login is executed at the account specified in the login request data, as sent by the first login component 108, for example. This account information can further correspond with or be specified in the login handler component 132, in which the login information can be used or stored in the user profile 124 communicatively coupled to the second login component 122.

At 706, a determination can be further performed or enabled by the second login component 122, for example, as to whether the account login issued successfully. If the determination is "no", then the process flows at 710 with a login request not being executed. If the determination is "yes", then the process flows at 708 to a final execution and thereby access to the corresponding account.

Figure 8:
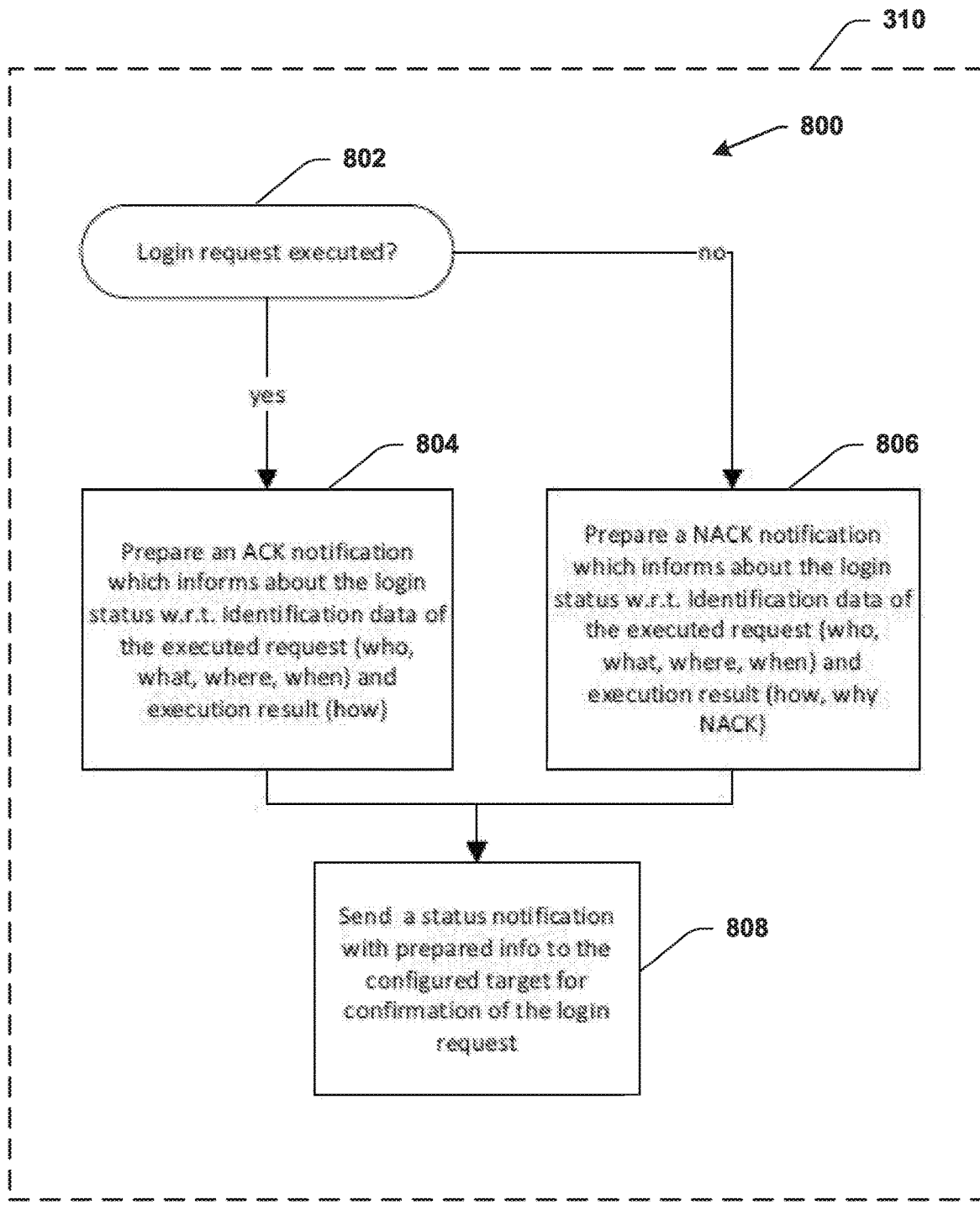
FIG. 8 a block diagram of a process flow for a login engine response according to various aspects described.

Referring to FIG. 8, illustrated is a detailed embodiment of the act 310 of FIG. 3 for a login response as a part of the login process for a login engine (e.g., 202). The method 800 initiates at the login request being executed or a determination thereof corresponding to the final act 708 of the method 700 in FIG. 7. If the login request has been executed ("yes"), the feedback component 206 can operate at 804 to prepare an acknowledgement (ACK) notification, which informs the user about the login status with respect to (wrt) identification data of the executed request involving who, what, where, when and execution result (how). This data can include for example any of the data as discussed above with a feedback message, for example.

If the login request has not been executed ("no") after the acts of method 700 of FIG. 7, the process flows at 806 where a negative acknowledgement (NACK) can be generated via the feedback component 206. The NACK can include login status information with respect to identification data of the executed requests (who, what, where, when) and the execution result (how, why NACK), for example.

At 808, a communication can be transmitted with a status notification with prepared information to the configured target for confirmation of the login request to be indicated.

Figure 9:
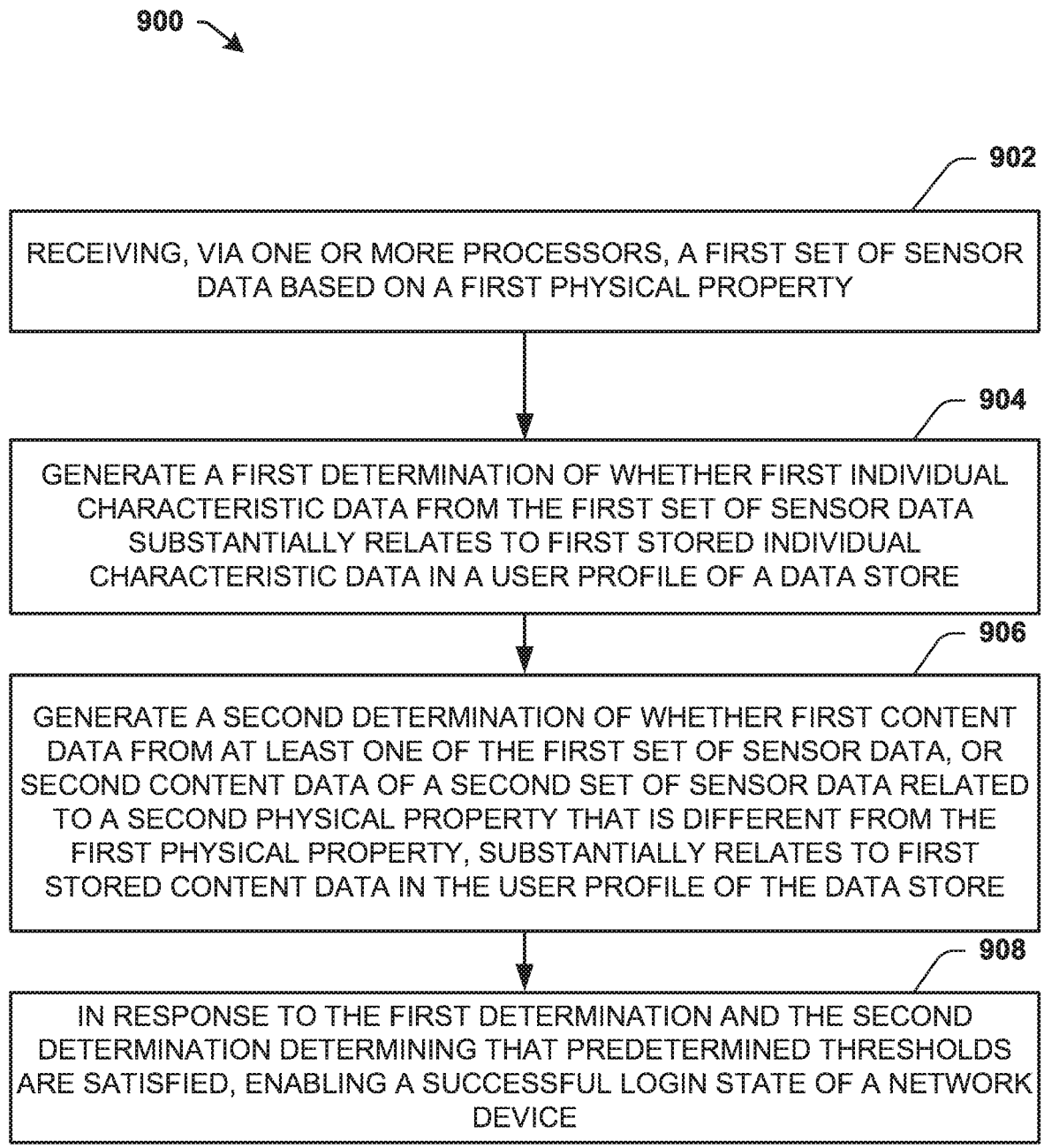
FIG. 9 a block diagram of another process flow for a login engine according to various aspects described.

Referring to FIG. 9, illustrated is another method 900 for a login engine of a login system based on various categories or types of sensor data. A method 900 for a login engine. The method 900 initiates in response to a login request received at the login engine (e.g., 202).

At 902, the method includes receiving, via one or more processors, a first set of sensor data based on a first physical property (e.g., audio properties).

At 904, the method includes generating, via the one or more processors, a first determination of whether first individual characteristic data from the first set of sensor data substantially relates to first stored individual characteristic data in a user profile of a data store.

At 906, the method includes generating, via the one or more processors, a second determination of whether first content data from at least one of the first set of sensor data, or second content data of a second set of sensor data related to a second physical property that is different from the first physical property, substantially relates to first stored content data in the user profile of the data store.

At 908, in response to the first determination and the second determination determining that predetermined thresholds are satisfied, the method includes enabling a successful login state of a network device.

In other aspects, the method 900 can further include generating at least one of a third determination and a fourth determination, wherein the third determination comprises determining whether second individual characteristic data from the second set of sensor data substantially relates to second stored individual characteristic data in the user profile by a comparison, and wherein the fourth determination comprises determining whether the second content data from the second set of sensor data substantially relates to second stored content data in the user profile by another comparison. In response to the at least one of third determination or the fourth determination determining that related predetermined thresholds are satisfied, the login engine 202 can further enable the successful login state of the network device.

Furthermore, the method 900 can include determining a synchronicity between the first set of sensor data and the second set of sensor data. In response to the synchronicity indicating an alignment, another successful login stage of the network device can be enabled to one or more accounts corresponding to the user profile.

Figure 10:
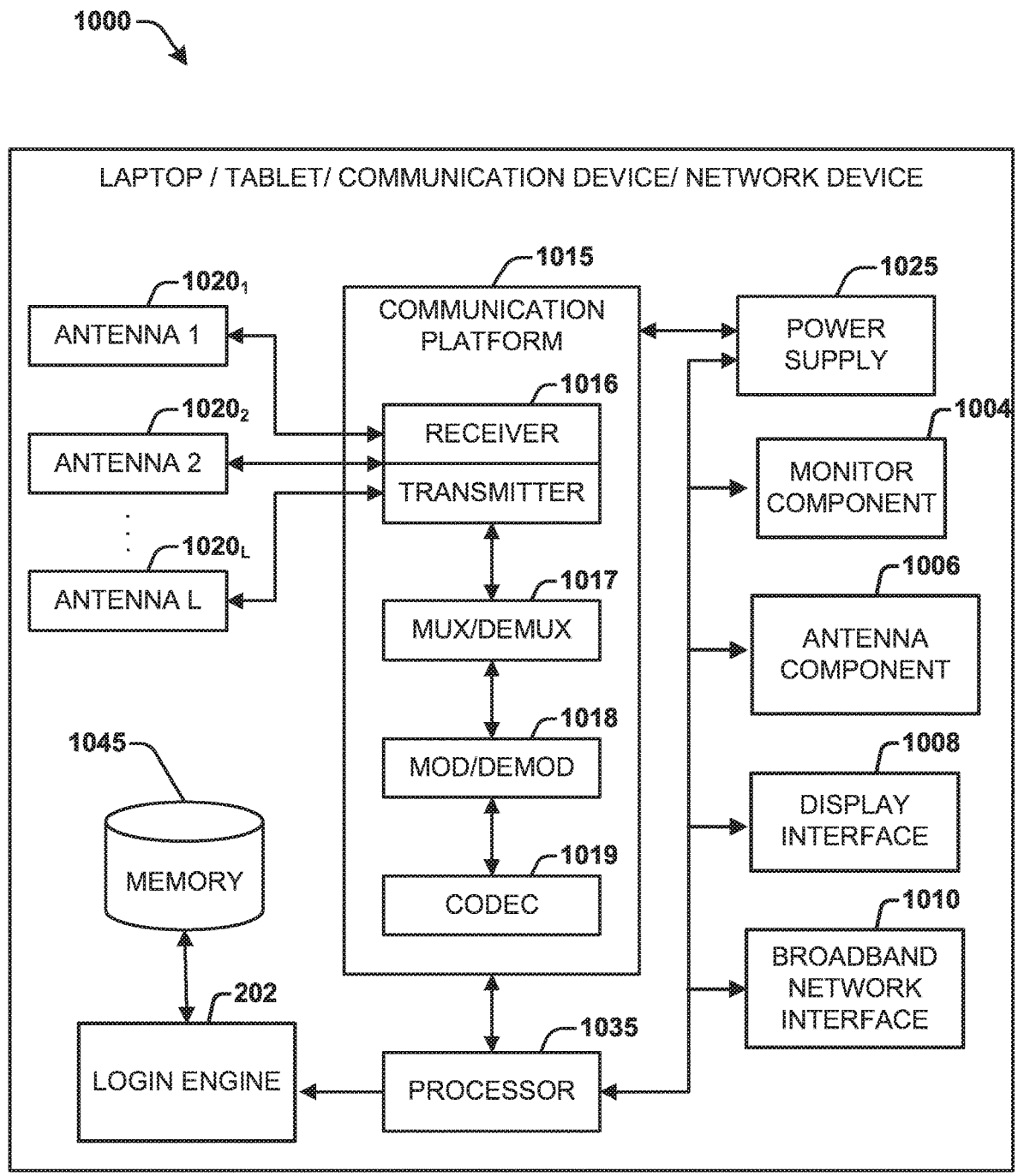
FIG. 10 is an exemplary wireless terminal for utilizing various aspects described.

In order to provide further context for various aspects of the disclosed subject matter, FIG. 10 illustrates a non-limiting example of a computing device, such as a laptop, tablet, or other communication device or wireless terminal 1000 that can implement some or all of the aspects described herein. In an aspect, wireless terminal, such as a laptop, tablet, other communication device, or wireless terminal 1000 can receive and transmit signal(s) to and/or from wireless devices such as APs, access terminals, wireless ports and routers, or the like, through a set of L antennas 1020, which can be configured according to one or more embodiments or aspects described herein. In one example, antennas 1020 can be implemented as part of a communication platform 1015, which in turn can comprise electronic components and associated circuitry and/or other means that provide for processing and manipulation of received signal(s) and signal(s) to be transmitted. The antennas 1020 can comprise the various antenna elements incorporating the different aspects or embodiments disclosed herein. In one example, the antennas 1020 can be located along an edge or side 1020 of the wireless terminal 1000, which can be within a same quadrant, section, portion or subset of the volume of the mobile device, opposing or different sections, for example.

In an aspect, communication platform 1015 can include a monitor component 1004 and antenna component 1006, which can couple to communication platform 1015 and include electronic components with associated circuitry that provide for processing and manipulation of received signal(s) and other signal(s) to be transmitted. The communication platform 1015 can further comprise a receiver/transmitter or transceiver 1016, which can transmit and receive signals and/or perform one or more processing operations on such signals (e.g., conversion from analog to digital upon reception, conversion from digital to analog upon transmission, etc.). In addition, transceiver 1016 can divide a single data stream into multiple, parallel data streams, or perform the reciprocal operation.

Additionally, the communication device 1000 can include display interface 1008, which can display functions that control functionality of the device 1000, or reveal operation conditions thereof. In addition, display interface 1008 can include a screen to convey information to an end user. In an aspect, display interface 1008 can be a liquid crystal display, a plasma panel, a monolithic thin-film based electro chromic display, and so on. Moreover, display interface 1008 can include a component (e.g., speaker) that facilitates communication of aural indicia, which can also be employed in connection with messages that convey operational instructions to an end user. Display interface 1008 can also facilitate data entry (e.g., through a linked keypad or through touch gestures), which can cause access equipment and/or software 1000 to receive external commands (e.g., restart operation).

Broadband network interface 1010 facilitates connection of access equipment and/or software 1000 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 1010 can be internal or external to access equipment and/or software 1000, and can utilize display interface 1008 for end-user interaction and status information delivery.

Processor 1035 can be functionally connected to communication platform 1008 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1035 can be functionally connected, through data, system, or an address bus, to display interface 1008 and broadband network interface 1010, to confer, at least in part, functionality to each of such components.

In another example, a multiplexer/demultiplexer (mux/demux) unit 1017 can be coupled to transceiver 1016. Mux/demux unit 1017 can, for example, facilitate manipulation of signal in time and frequency space. Additionally or alternatively, mux/demux unit 1017 can multiplex information (e.g., data/traffic, control/signaling, etc.) according to various multiplexing schemes such as time division multiplexing (TDM), frequency division multiplexing (FDM), orthogonal frequency division multiplexing (OFDM), code division multiplexing (CDM), space division multiplexing (SDM), or the like. In addition, mux/demux unit 1017 can scramble and spread information according to substantially any code generally known in the art, such as Hadamard-Walsh codes, Baker codes, Kasami codes, polyphase codes, and so on.

In a further example, a modulator/demodulator (mod/demod) unit 1018 implemented within communication platform 1015 can modulate information according to multiple modulation techniques, such as frequency modulation, amplitude modulation (e.g., L-ary quadrature amplitude modulation (L-QAM), etc.), phase-shift keying (PSK), and the like. Further, communication platform 1015 can also include a coder/decoder (codec) module 1019 that facilitates decoding received signal(s) and/or coding signal(s) to convey.

According to another aspect, wireless terminal 1000 can include a processor 1035 configured to confer functionality, at least in part, to substantially any electronic component utilized by wireless terminal 1000. As further shown in system 1000, a power supply 1025 can attach to a power grid and include one or more transformers to achieve a power level at which various components and/or circuitry associated with wireless terminal 1000 can operate. In one example, power supply 1025 can include a rechargeable power mechanism to facilitate continued operation of wireless terminal 1000 in the event that wireless terminal 1000 is disconnected from the power grid, the power grid is not operating, etc. The antennas 1020, for example, with the other antenna element configurations disclosed herein can further facilitate communications with a wireless charging of the power supply 1025, such as with a transfer of energy from the antenna system to the power supply 1025 via an oscillating magnetic field, for example.

In a further aspect, processor 1035 can be functionally connected to communication platform 1015 and can facilitate various operations on data (e.g., symbols, bits, chips, etc.), which can include, but are not limited to, effecting direct and inverse fast Fourier transforms, selection of modulation rates, selection of data packet formats, inter-packet times, etc. In another example, processor 1035 can be functionally connected, via a data or system bus (e.g., a wireless PCIE or the like), to any other components or circuitry not shown in system 1000 to at least partially confer functionality to each of such components, such as by the antenna systems disclosed herein.

As additionally illustrated, a memory 1045 can be used by wireless terminal 1000 to store data structures, code instructions and program modules, system or device information, code sequences for scrambling, spreading and pilot transmission, location intelligence storage, determined delay offset(s), over-the-air propagation models, and so on. Processor 1035 can be coupled to the memory 1045 in order to store and retrieve information necessary to operate and/or confer functionality to communication platform 1015 and/or any other components of wireless terminal 1000.

Further, the antenna systems described above with the communication device 1000 can also be configured, for example, to operate at a wide range of frequencies in a high band frequency range additionally include peer-to-peer (e.g., mobile-to-mobile) ad hoc network systems often using unpaired unlicensed spectrums, 802.xx wireless LAN, BLUETOOTH and any other short- or long-range, wireless frequency ranges and communication techniques. The narrow band antenna elements disclosed herein, such as antennas resonating systems of devices disclosed, for example, can also be configured to operate at other frequency ranges also.

In other examples, the components (login components 108, 122) disclosed herein can operate to communicate wirelessly with other components, such as the display interface 1008 as a wireless device, or with other wireless interfaces, such as a wireless USB device, for example. For example, a wireless USB device can communicate within a 3.1 to a 10.6 GHz frequency range. In addition, the antenna systems disclosed can be configured to communicate with other wireless connections, components, interfaces or devices in order to provide communication interfacing for wireless component-to-component communications. For example, a PCB to PCB interface can be facilitated by the high band antenna systems as well as micro millimeter wave communications among one or more internal or external components. Other communication interfaces can also be facilitated by the antenna elements disclosed such as an internet of things (IoT) to IoT components, wearable components, mobile to mobile, a network base station (e.g., a macro cell network device, femto cell device, pico cell device or other network devices) or any combination thereof to communicate via one of more of the antenna elements, such as via the antenna system or devices herein, for example. Additional other examples are also envisioned by which the antenna systems disclosed herein can operate in different frequency ranges, as well as communication and facilitate communications with, or among, one or more wireless components or devices. For example, industrial, scientific and medical (ISM) radio bands, radar band widths, or other ranges of a frequency spectrum can also be facilitated for communications by the antenna systems being disclosed.

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus to be employed within a login engine of a network device comprising: a first login component, communicatively coupled to a plurality of sensors that determine sensor data related to one or more different physical properties, configured to, in response to a login request: generate a first comparison between one or more first individual characteristics related to a first physical property of the one or more different physical properties and a first set of individual characteristics in a user profile; generate a second comparison between one or more first content data related to at least one of the first physical property, or a second physical property that is different from the first physical property, with a first set of content data in the user profile; and in response to the first comparison and the second comparison satisfying predetermined thresholds, respectively, enabling a first successful login stage of a plurality of login stages of the network device.

Example 2 includes the subject matter of Example 1, wherein the first login component, or a second login component that is communicatively coupled to the first login component, is configured to generate at least one of a third comparison or a fourth comparison, and in response to the at least one of the third comparison or the fourth comparison satisfying one or more predetermined thresholds, respectively, enabling another successful login stage of the plurality of login stages of the network device; and wherein the third comparison is between one or more second individual characteristics of the second physical property with a second set of profile individual characteristics in the user profile, and the fourth comparison is between one or more second content data corresponding to the second physical property with a second set of individual characteristics in the user profile.

Example 3 includes the subject matter of any of Examples 1-2, including or omitting any elements, further comprising: the second login component, communicatively coupled to the first login component, further configured to generate a synchronicity determination between at least two of: the one or more first individual characteristics, the one or more first content data, the one or more first individual characteristics, or the one or more second individual characteristics, based on whether first sensor data aligns with second sensor data according to a predetermined synchronicity threshold.

Example 4 includes the subject matter of any of Examples 1-3, including or omitting any elements, wherein the plurality of sensors comprise one or more audio sensors configured to detect voice audio signals, a visual sensor configured to detect video signals, or a distance sensor configured to detect a distance of an external object corresponding to the login request and the network device, and wherein the one or more first individual characteristics comprise biometric data and the one or more first content data comprise a message or a sequence generated by the biometric data.

Example 5 includes the subject matter of any of Examples 1-4, including or omitting any elements, further comprising: a user profile component configured to generate the user profile by training a data store with one or more first stored individual characteristics and one or more first stored content data, and associating the user profile to one or more different user login accounts and the network device.

Example 6 includes the subject matter of any of Examples 1-5, including or omitting any elements, further comprising: a second login component, communicatively coupled to the first login component, configured to determine a synchronicity between first sensor data of the first physical property detected by a first sensor and a second sensor data of the second physical property detected by a second sensor, and in response to the synchronicity satisfying a synchronicity threshold further enabling another successful login stage of the plurality of login stages of the network device, wherein the first sensor data comprises the one or more first individual characteristics and the one or more first content data, and the second sensor data comprises another individual characteristic and another content datum related to the second physical property.

Example 7 includes the subject matter of any of Examples 1-6, including or omitting any elements, further comprising: a feedback component configured to generate a feedback message related to the login request, the feedback message comprising at least one of a network device identification, a current location, a current time, an account, an execution status or a login engine identifier, wherein the feedback component further comprises an email handler configured to communicate the feedback message in response to the login request.

Example 8 includes the subject matter of any of Examples 1-7, including or omitting any elements, further comprising: a confirmation component configured to, in response to the first successful login stage of the plurality of login stages, determine whether a current location, a current time, an account identification, a login execution status or a login engine identifier, associated with the network device, substantially match the user profile in response.

Example 9 is a login engine system employed in a login engine of a wireless network, the login engine system comprising: a first login component, communicatively coupled to a first sensor, configured, in response to a login request, to: receive a first sensor data related to a first physical property; generate a first determination of whether a first set of individual characteristics of the first sensor data substantially matches a first stored set of individual characteristics in an associated user profile; generate a second determination of whether a first set of content data that corresponds to the first physical property, or to a second physical property that is different from the first physical property, substantially matches a first stored set of content data in the associated user profile; and in response to the first determination and the second determination comprising a substantial match, enabling a successful login stage of a network device.

Example 10 includes the subject matter of Example 9, wherein the first login component is communicatively coupled to a second sensor that is configured to receive a second sensor data related to the second physical property, wherein the first physical property comprises a different physical property than the second physical property.

Example 11 includes the subject matter of any of Examples 9-10, including or omitting any elements, login engine system of claim 9, wherein the first login component is further configured, based on second sensor data of the second physical property from a second sensor, to generate one or more of a third determination or a fourth determination, wherein the third determination comprises determining whether a second set of individual characteristics of the second physical property substantially matches a second stored set of individual characteristics in the associated user profile with the second physical property, and the fourth determination comprises determining whether a second set of content data of the second physical property substantially matches a second stored set of content data corresponding to the associated user profile with the second physical property, and in response to the one or more of the third determination or the fourth determination comprising another substantial match, enabling the successful login stage of the network device.

Example 12 includes the subject matter of any of Examples 9-11, including or omitting any elements, further comprising: a second login component, communicatively coupled to the first login component, configured to generate a synchronicity determination between the first sensor data and the second sensor data based on whether the first sensor data aligns with the second sensor data according to a predetermined synchronicity threshold.

Example 13 includes the subject matter of any of Examples 9-12, including or omitting any elements, wherein the second login component is further configured to generate the synchronicity determination based on a comparison between at least two of: the first set of individual characteristics, the first set of content data, the second set of individual characteristics or the second set of content data.

Example 14 includes the subject matter of any of Examples 9-13, including or omitting any elements, further comprising: a feedback component configured to generate a feedback message related to the login request, the feedback message comprising one or more of a network device identification, a current location, a current time, an account identification, an execution status of the login request or a login engine identifier, and communicate the feedback message based on a communication address or a designated communication path designated in the associated user profile.

Example 15 includes the subject matter of any of Examples 9-14, including or omitting any elements, further comprising: a user profile component configured to generate the associated user profile, process the first stored set of individual characteristics of the associated user profile in a data store, and enable the associated user profile to access different user login accounts associated with the associated user profile in response to the successful login stage of the network device.

Example 16 includes the subject matter of any of Examples 9-15, including or omitting any elements, further comprising: a confirmation component configured to generate a second stage login determination of whether one or more of a current location, a current time, an account, an execution status or a login engine identifier, associated with the network device, substantially match the associated user profile and, in response to the second stage login determination satisfying a predetermined threshold, enabling a second successful login stage of the network device.

Example 17 includes the subject matter of any of Examples 9-16, including or omitting any elements, wherein the first physical property and the second physical property comprise different physical properties based on user property selections of the associated user profile comprising at least two of a user video visual property, a user audio property, or a distance property.

Example 18 is a method for a login engine comprising: in response to a login request received at the login engine: receiving, via one or more processors, a first set of sensor data based on a first physical property; generating, via the one or more processors, a first determination of whether first individual characteristic data from the first set of sensor data substantially relates to first stored individual characteristic data in a user profile of a data store; generating, via the one or more processors, a second determination of whether first content data from at least one of the first set of sensor data, or second content data of a second set of sensor data related to a second physical property that is different from the first physical property, substantially relates to first stored content data in the user profile of the data store; and in response to the first determination and the second determination determining that predetermined thresholds are satisfied, enabling a successful login state of a network device.

Example 19 includes the subject matter of Example 18, further comprising: generating at least one of a third determination and a fourth determination, wherein the third determination comprises determining whether second individual characteristic data from the second set of sensor data substantially relates to second stored individual characteristic data in the user profile by a comparison, and wherein the fourth determination comprises determining whether the second content data from the second set of sensor data substantially relates to second stored content data in the user profile by another comparison; and in response to the at least one of third determination or the fourth determination determining that related predetermined thresholds are satisfied, further enabling the successful login state of the network device.

Example 20 includes the subject matter of any of Examples 18-19, including or omitting any elements, wherein the first content data is only from the first set of sensor data.

Example 21 includes the subject matter of any of Examples 18-20, including or omitting any elements, further comprising: determining a synchronicity between the first set of sensor data and the second set of sensor data; and in response to the synchronicity indicating an alignment, enabling another successful login stage of the network device to one or more accounts corresponding to the user profile.

Example 22 includes the subject matter of any of Examples 18-21, including or omitting any elements, further comprising: generating the user profile by training the data store with the first stored individual characteristic data and the first stored content data with the user profile, and associating the user profile to one or more different user login accounts and the network device.

Example 23 includes the subject matter of any of Examples 18-22, including or omitting any elements, further comprising: generating a feedback message related to the login request, the feedback message comprising a network device identification, a current location of the network device, a current time of the login request, an account associated with the login request, an execution status related to the login request, and a login engine identifier.

Example 24 includes the subject matter of any of Examples 18-23, including or omitting any elements, further comprising: receiving sensor data from a plurality of sensors related to different physical properties comprising one or more of an audio property, a visual property, or a distance in response to the login request.

Example 25 is a system for a login engine comprising: in response to a login request received at the login engine: means for receiving, via one or more processors, a first set of sensor data based on a first physical property; means for generating, via the one or more processors, a first determination of whether first individual characteristic data from the first set of sensor data substantially relates to first stored individual characteristic data in a user profile of a data store; means for generating, via the one or more processors, a second determination of whether first content data from at least one of the first set of sensor data, or second content data of a second set of sensor data related to a second physical property that is different from the first physical property, substantially relates to first stored content data in the user profile of the data store; and means for enabling a successful login state of a network device in response to the first determination and the second determination determining that predetermined thresholds are satisfied.

Example 26 includes the subject matter of Example 25, including or omitting any elements, further comprising: means for generating at least one of a third determination and a fourth determination, wherein the third determination comprises determining whether second individual characteristic data from the second set of sensor data substantially relates to second stored individual characteristic data in the user profile by a comparison, and wherein the fourth determination comprises determining whether the second content data from the second set of sensor data substantially relates to second stored content data in the user profile by another comparison; and means for enabling the successful login state of the network device in response to the at least one of third determination or the fourth determination determining that related predetermined thresholds are satisfied.

Example 27 includes the subject matter of any of Examples 25-26, including or omitting any elements, wherein the first content data is only from the first set of sensor data.

Example 28 includes the subject matter of any of Examples 25-27, including or omitting any elements, further comprising: means for determining a synchronicity between the first set of sensor data and the second set of sensor data; and means for enabling another successful login stage of the network device to one or more accounts corresponding to the user profile in response to the synchronicity indicating an alignment.

Example 29 includes the subject matter of any of Examples 25-28, including or omitting any elements, further comprising: means for generating the user profile by training the data store with the first stored individual characteristic data and the first stored content data with the user profile, and associating the user profile to one or more different user login accounts and the network device.

Example 30 includes the subject matter of any of Examples 25-29, including or omitting any elements, further comprising: means for generating a feedback message related to the login request, the feedback message comprising a network device identification, a current location of the network device, a current time of the login request, an account associated with the login request, an execution status related to the login request, and a login engine identifier.

Example 31 includes the subject matter of any of Examples 25-31, including or omitting any elements, further comprising: means for receiving sensor data from a plurality of sensors related to different physical properties comprising one or more of an audio property, a visual property, or a distance in response to the login request.

Applications (e.g., program modules) can include routines, programs, components, data structures, etc., that perform particular tasks or implement particular abstract data types. Moreover, those skilled in the art will appreciate that the operations disclosed can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated mobile or personal computing devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media (e.g., one or more data stores) can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques, such as millimeter wave bands in the range of 30 GHz to 300 GHz, for example.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. An apparatus of a network device comprising:
   one or more hardware processors configured to execute executable instructions stored in a memory coupled to the one or more hardware processors that execute executable components, the executable components comprising:
   a first login component, communicatively coupled to a plurality of sensors that determine sensor data related to one or more different physical properties, configured to, in response to a login request:
   generate a plurality of first comparisons between one or more first individual characteristics from first sensor data based on a first physical property of the one or more different physical properties and a first set of individual characteristics in a user profile, and between one or more second individual characteristics from second sensor data based on a second physical property that is different from the first physical property and a second set of individual characteristics in the user profile, wherein the first physical property comprises an audio property or a video property and the second physical property comprises a distance property, wherein the first sensor data comprises audio data or video data, and the second sensor data comprises data comprising distances of an object from the network device;

generate a plurality of second comparisons between one or more first content data from the first sensor data based on the first physical property and a first set of content data in the user profile, and between one or more second content data from the second sensor data based on the second physical property and a second set of content data in the user profile;

a second login component, communicatively coupled to the first login component and the plurality of sensors, configured to, in response to the plurality of the first comparisons and the plurality of second comparisons satisfying predetermined thresholds, respectively, determine a synchronicity between the first sensor data of the first physical property and the second sensor data of the second physical property based on the one or more first individual characteristics and the one or more second individual characteristics, and in response to the synchronicity satisfying a synchronicity threshold further enabling a second successful login stage of a plurality of login stages of the network device;

a feedback component configured to generate a feedback message related to the login request, the feedback message comprising a network device identification, a current location of the network device, a current time of the login request, an account associated with the login request, an execution status related to the login request, and a login engine identifier, wherein the feedback component further comprises an email handler configured to communicate the feedback message in response to the login request; and a communication platform, coupled to the one or more hardware processors, comprising a receiver and a transmitter for receiving and transmitting data for the first login component and the second login component based on the plurality of sensors, a first successful login stage, or the second successful login stage.

2. The apparatus of claim 1, wherein the plurality of sensors comprise one or more audio sensors configured to detect voice audio signals, or a visual sensor configured to detect video signals, and a distance sensor configured to detect a distance of an external object corresponding to the login request and the network device, and wherein the one or more first individual characteristics comprise biometric data and the one or more first content data comprise a message or a sequence generated by the biometric data.

3. The apparatus of claim 1, wherein the executable components further comprise:
a user profile component that generates the user profile by training a data store with one or more first stored individual characteristics and one or more first stored content data, and associating the user profile to one or more different user login accounts and the network device.

4. The apparatus of claim 1, wherein the executable components further comprise:
a confirmation component that, in response to the first successful login stage of the plurality of login stages, determines whether the current location of the network device, the current time of the login request, the account associated with the login request, the execution status related to the login request or the login engine identifier match the user profile in response.

5. A login engine system employed in a login engine of a wireless network, the login engine system comprising:
a network device comprising a first sensor configured to provide first sensor data related to a first physical property of a user, a second sensor configured to provide second sensor data related to a second physical property that is different from the first physical property, and one or more hardware processors, coupled to the first sensor and the second sensor, configured to execute executable instructions stored in a memory that execute one or more executable components, the one or more executable components comprising:
a first login component, in response to a login request, to:
generate a plurality of first determinations comprising: whether a first set of individual characteristics based on the first sensor data matches a first stored set of individual characteristics in an associated user profile, and whether a second set of individual characteristics based on the second sensor data matches a second stored set of individual characteristics in the associated user profile, wherein the first physical property comprises an audio property or a video property and the second physical property comprises a distance property, wherein the first sensor data comprises audio data or video data, and the second sensor data comprises data comprising distances of an object or user from the network device;
generate a plurality of second determinations comprising: whether a first set of content data based on the first physical property matches a first stored set of content data in the associated user profile, and whether a second set of content data based on the second physical property matches a second stored set of content data in the associated user profile; and
in response to the plurality of first determinations and the plurality of second determinations comprising matches, enabling a first successful login stage;
a feedback component configured to generate a feedback message related to the login request, the feedback message comprising a network device identification, a current location of the network device, a current time of the login request, an account associated with the login request, an execution status related to the login request, and a login engine identifier, wherein the feedback component further comprises an email handler configured to communicate the feedback message in response to the login request; and
a home gateway device, communicatively coupled to the network device, comprising a processor configured to execute a second login component configured to generate a synchronicity determination between the first sensor data and the second sensor data based on the first set of individual characteristics of the first sensor data and the second set of individual characteristics of the second sensor data to determine whether the first sensor data aligns with the second sensor data according to a predetermined synchronicity threshold in response to the first successful login stage being enabled based on the plurality of first determinations.

6. The login engine system of claim 5, wherein the one or more executable components further comprise:
a user profile component that generates the associated user profile, processes the first stored set of individual characteristics of the associated user profile in a data store, and enables the associated user profile to access different user login accounts associated with the associated user profile in response to the first successful login stage.

7. The login engine system of claim 5, wherein the one or more executable components further comprise:
a confirmation component that generates a second stage login determination of whether the current location of the network device, the current time of the login request, the account associated with the login request, the execution status related to the login request or the login engine identifier, match the associated user profile and, in response to the second stage login determination satisfying a predetermined threshold, enabling a second successful login stage.

8. The login engine system of claim 5, wherein the first physical property and the second physical property comprise different physical properties based on user property selections of the associated user profile comprising at least two of a user video visual property, a user audio property, or the distance property.

9. A method for a login engine of a network device comprising:
in response to a login request received at the login engine:
receiving, via one or more hardware processors, a first set of sensor data from a first sensor based on a first physical property and a second set of sensor data from a second sensor based on a second physical property that is different from the first physical property;
generating, via the one or more hardware processors, first determinations of whether first individual characteristic data from the first set of sensor data relates to first stored individual characteristic data in a user profile of a data store, and whether second individual characteristic data from the second set of sensor data relates to second stored individual characteristic data in the user profile of the data store, wherein the first physical property comprises an audio property or a video property and the second physical property comprises a distance property, wherein the first set of sensor data comprises audio data or video data, and the second set of sensor data comprises data comprising distances of an object or user from the network device;
generating, via the one or more hardware processors, second determinations of whether first content data from the first set of sensor data relates to first stored content data in the user profile of the data store, and whether second content data from the second set of sensor data relates to second stored content data in the user profile of the data store;
generating, via the one or more hardware processors, a feedback message related to the login request, the feedback message comprising a network device identification, a current location of the network device, a current time of the login request, an account associated with the login request, an execution status related to the login request, and a login engine identifier;
generating, via the one or more hardware processors, an email handler configured to communicate the feedback message in response to the login request; and in response to the first determinations and the second determinations determining that predetermined thresholds are satisfied, via the one or more hardware processors, enabling a successful login state of the network device and determining a synchronicity between the first set of sensor data and the second set of sensor data based on the first individual characteristic data from the first set of sensor data and the second individual characteristic data from the second set of sensor data, and, in response to the synchronicity indicating an alignment, enabling another successful login stage of the network device to one or more accounts corresponding to the user profile.

10. The method of claim 9, further comprising:
generating the user profile by training the data store with the first stored individual characteristic data and the first stored content data with the user profile, and associating the user profile to one or more different user login accounts and the network device.

* * * * *